(12) United States Patent
Inoue

(10) Patent No.: US 8,996,291 B2
(45) Date of Patent: Mar. 31, 2015

(54) POSITIONING SYSTEM AND IN-VEHICLE DEVICE

(75) Inventor: Noriaki Inoue, Kobe (JP)

(73) Assignee: Fujitsu Ten Limited, Hyogo (JP)

( * ) Notice: Subject to any disclaimer, the term of this patent is extended or adjusted under 35 U.S.C. 154(b) by 763 days.

(21) Appl. No.: 12/742,808

(22) PCT Filed: Nov. 13, 2008

(86) PCT No.: PCT/JP2008/070699
§ 371 (c)(1),
(2), (4) Date: May 13, 2010

(87) PCT Pub. No.: WO2009/063946
PCT Pub. Date: May 22, 2009

(65) Prior Publication Data
US 2010/0286912 A1 Nov. 11, 2010

(30) Foreign Application Priority Data

Nov. 13, 2007 (JP) .................................. 2007-294462
Nov. 19, 2007 (JP) .................................. 2007-299417

(51) Int. Cl.
*G01C 21/00* (2006.01)
*G01S 19/48* (2010.01)

(52) U.S. Cl.
CPC ........................................ *G01S 19/48* (2013.01)
USPC ............................................................ 701/215

(58) Field of Classification Search
CPC ....................................................... G01S 19/48
USPC .......................................................... 701/215
See application file for complete search history.

(56) References Cited

U.S. PATENT DOCUMENTS 6,807,484 B2 * 10/2004 Inoue et al. .................... 701/454
7,593,739 B2    9/2009 Oguri et al.
(Continued)

FOREIGN PATENT DOCUMENTS

CN    1865855      11/2006
GB    2 378 071    1/2003
(Continued)

OTHER PUBLICATIONS

Japanese Office Action issued Feb. 17, 2012 in Japanese Application No. 2007-294462.
(Continued)

*Primary Examiner* — Maceeh Anwari
(74) *Attorney, Agent, or Firm* — Wenderoth, Lind & Ponack, L.L.P.

(57) ABSTRACT

A positioning system is configured such that an in-vehicle device includes an in-vehicle-side positioning unit that obtains in-vehicle-side positioning data that includes in-vehicle-side positioning coordinates representing positioned coordinates and a transmitting unit that transmits the in-vehicle-side positioning data obtained by the in-vehicle-side positioning unit to a portable terminal device. In addition, the portable terminal device includes a portable-side positioning unit that obtains portable-side positioning data that includes portable-side positioning coordinates representing positioned coordinates, a selecting unit that selects the in-vehicle-side positioning unit and/or the portable-side positioning unit based on a positioning environment, and a vehicle-position calculating unit that calculates a vehicle position based on positioning coordinates of a positioning unit selected by the selecting unit.

14 Claims, 16 Drawing Sheets

(56) References Cited

U.S. PATENT DOCUMENTS

2006/0247890 A1 * 11/2006 Oguri et al. .................. 702/150
2007/0203641 A1    8/2007 Diaz et al.

FOREIGN PATENT DOCUMENTS

| | | |
|---|---|---|
| JP | 9-113600 | 5/1997 |
| JP | 09-113600 * | 5/1997 |
| JP | 2002-181555 | 6/2002 |
| JP | 2002-357430 | 12/2002 |
| JP | 2003-214870 | 7/2003 |
| JP | 2004-340633 | 12/2004 |
| JP | 2005-106720 | 4/2005 |
| JP | 2005-214630 | 8/2005 |
| JP | 2005-241391 | 9/2005 |
| JP | 2008-48051 | 2/2008 |
| JP | 2008-512679 | 4/2008 |
| JP | 2009-121885 | 6/2009 |
| JP | 2007-294462 | 7/2012 |
| WO | 2006/135418 | 12/2006 |

OTHER PUBLICATIONS

International Search Report issued Dec. 22, 2008 in International (PCT) Application No. PCT/JP2008/070699.
Chinese Office Action issued Feb. 28, 2012 in corresponding Chinese Application No. 200880115870.6, with English translation thereof.
Chinese Office Action (including translation) mailed Aug. 13, 2012 in corresponding Chinese Application No. 200880115870.6.
Chinese Office Action (with English translation) mailed Dec. 5, 2012 in corresponding Chinese Patent Application No. 200880115870.6.
Japanese Office Action mailed Apr. 2, 2013 in corresponding Japanese Application No. 2007-299417 (including English translation).

* cited by examiner

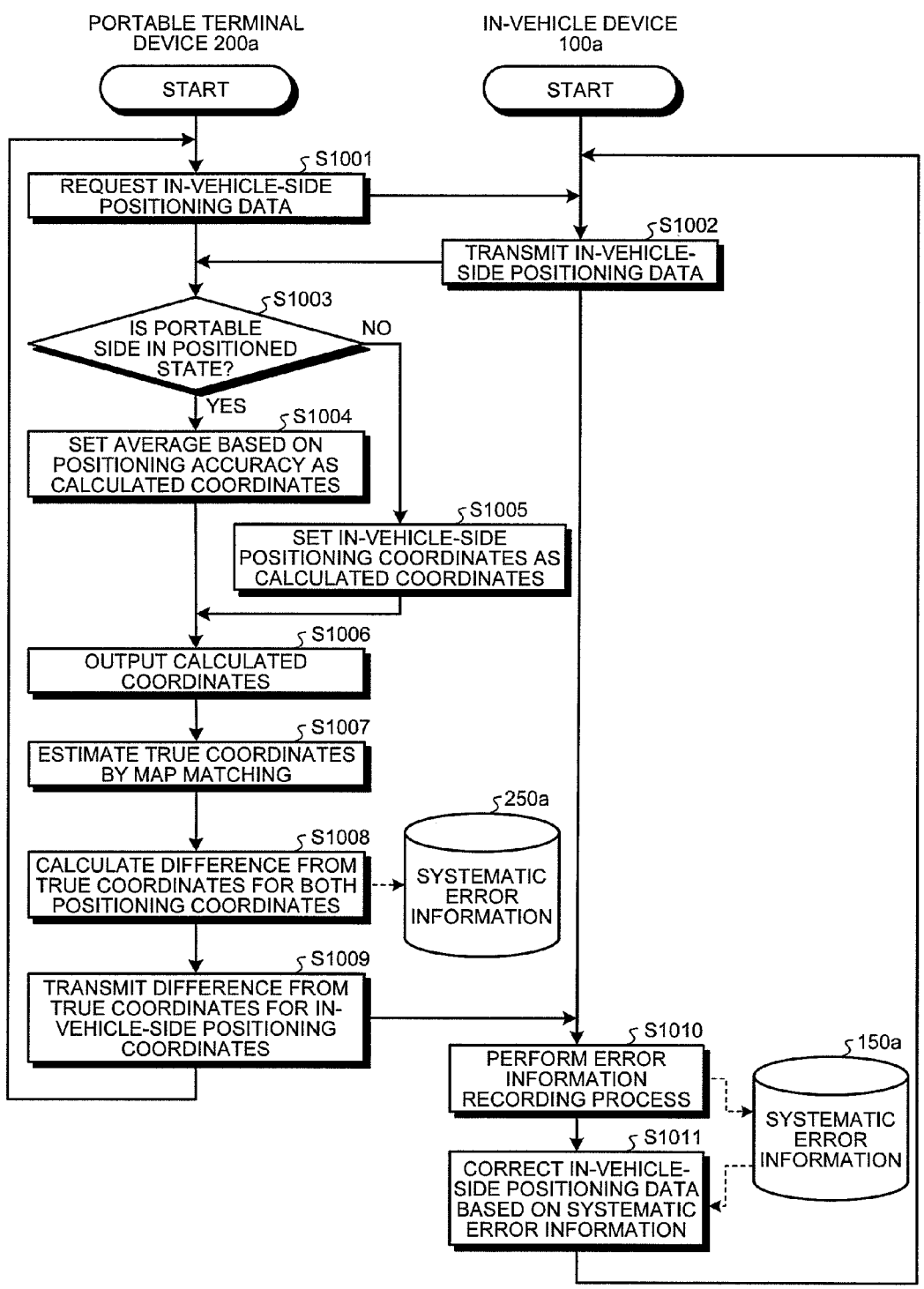

POSITIONING SYSTEM AND IN-VEHICLE DEVICE

TECHNICAL FIELD

This invention relates to a positioning system that positions a vehicle position by an in-vehicle device and a portable terminal device that are mounted on a vehicle, and an in-vehicle device, and particularly relates to a positioning system and an in-vehicle device capable of improving a positioning accuracy when a vehicle is driving.

BACKGROUND ART

A vehicle navigation system is known, in which a current position is calculated by utilizing a GPS (Global Positioning System) positioning function, a gyroscope, a vehicle speed sensor, and the like, and a local vehicle position is synthesized with map information on roads and buildings around the vehicle position to be displayed on a display.

Moreover, in accordance with the improvement in performance of portable terminal devices such as a cell phone and a PDA (Personal Digital Assistant), a pedestrian navigation system that has the GPS positioning function is realized even in these portable terminal devices.

An attempt has been made to improve convenience for passengers by connecting the portable terminal device having the pedestrian navigation function and the in-vehicle device having the vehicle navigation system. For example, Patent document 1 discloses a technology in which navigation to a destination is continued even outside a vehicle by transmitting navigation information from the in-vehicle device to the portable terminal device when a passenger leaves the vehicle.

Patent document 1: Japanese Laid-open Patent Publication No. 2002-181555

DISCLOSURE OF INVENTION

Problem to be Solved by the Invention

However, in the technology in Patent document 1, although a GPS positioning function for the in-vehicle device and a GPS positioning function for the portable terminal device are combined, the technology in Patent document 1 only uses both GPS positioning functions while switching them. In other words, the technology in Patent document 1 uses the GPS positioning function for in-vehicle tuned to a driving speed of the vehicle at the time of driving and uses the GPS positioning function for portable tuned to a walking speed of a user at the time of walking.

In this manner, the GPS positioning function for portable is typically not used when the vehicle is driving. This is generally considered to be because the accuracy of the GPS positioning function for portable is lower than the accuracy of the GPS positioning function for in-vehicle. However, the accuracy of the GPS positioning function for in-vehicle and the GPS positioning function for portable has advantages and disadvantages and the accuracy of the GPS positioning function for portable is not always lower.

For example, when the GPS positioning function for portable is compared with the GPS positioning function for in-vehicle, the GPS positioning function for portable has an advantage in that the GPS positioning function has higher sensitivity and thus is impervious to shielding. This is because the GPS positioning function for portable is premised on the indoor use and therefore has an enhanced filter to be able to receive even a satellite radio wave of a portion of which S/N ratio (Signal to Noise ratio) is low, and is often compatible with an assist GPS (AGPS) in which auxiliary information for the GPS positioning is received from a server device via a network to be used for the GPS positioning.

Accordingly, it is a major problem how to realize a positioning system or an in-vehicle device capable of improving the positioning accuracy when the vehicle is driving by using the GPS positioning function for portable in addition to the GPS positioning function for in-vehicle when the vehicle is driving.

This invention is aimed at providing a positioning system and an in-vehicle device capable of improving a positioning accuracy when a vehicle is driving by using a positioning result by a GPS positioning function for in-vehicle and a positioning result by a GPS positioning function for portable.

Means for Solving Problem

According to one aspect of the present invention, a positioning system that positions a vehicle position by an in-vehicle device mounted on a vehicle and a portable terminal device, wherein the in-vehicle device includes an in-vehicle-side positioning unit that obtains in-vehicle-side positioning data that includes in-vehicle-side positioning coordinates representing positioned coordinates, and a transmitting unit that transmits the in-vehicle-side positioning data obtained by the in-vehicle-side positioning unit to the portable terminal device, and the portable terminal device includes a portable-side positioning unit that obtains portable-side positioning data that includes portable-side positioning coordinates representing positioned coordinates, a selecting unit that selects the in-vehicle-side positioning data and/or the portable-side positioning data based on a positioning environment, and a vehicle-position calculating unit that calculates the vehicle position based on positioning data selected by the selecting unit.

Further, according to another aspect of the present invention, an in-vehicle device that positions a vehicle position in cooperation with a portable terminal device, includes: an in-vehicle-side positioning unit that obtains in-vehicle-side positioning data that includes in-vehicle-side positioning coordinates representing positioned coordinates; a receiving unit that receives portable-side positioning data that includes portable-side positioning coordinates representing coordinates positioned by the portable terminal device; a selecting unit that selects the in-vehicle-side positioning data and/or the portable-side positioning data based on a positioning environment; and a vehicle-position calculating unit that calculates the vehicle position based on positioning data selected by the selecting unit.

Further, according to still another aspect of the present invention, a positioning system that positions a vehicle position by an in-vehicle device mounted on a vehicle and a portable terminal device, wherein the in-vehicle device includes an in-vehicle-side positioning unit that obtains in-vehicle-side positioning coordinates representing positioned coordinates and an in-vehicle-side positioning accuracy representing accuracy in positioning, and a transmitting unit that transmits the in-vehicle-side positioning coordinates and the in-vehicle-side positioning accuracy obtained by the in-vehicle-side positioning unit to the portable terminal device, and the portable terminal device includes a portable-side positioning unit that obtains portable-side positioning coordinates representing positioned coordinates and a portable-side positioning accuracy representing accuracy in positioning, and a vehicle-position calculating unit that calculates the vehicle position from the in-vehicle-side positioning coordinates and the portable-side positioning coordinates based on the in-vehicle-side positioning accuracy and the portable-side positioning accuracy.

Further, according to still another aspect of the present invention, an in-vehicle device that positions a vehicle position in cooperation with a portable terminal device, including: an in-vehicle-side positioning unit that obtains in-vehicle-side positioning coordinates representing positioned coordinates and an in-vehicle-side positioning accuracy representing accuracy in positioning; a receiving unit that receives portable-side positioning coordinates representing coordinates positioned by the portable terminal device and a portable-side positioning accuracy representing accuracy in positioning; and a vehicle-position calculating unit that calculates the vehicle position from the in-vehicle-side positioning coordinates and the portable-side positioning coordinates based on the in-vehicle-side positioning accuracy and the portable-side positioning accuracy.

Effect of the Invention

According to one embodiment of the present invention, the in-vehicle device obtains the in-vehicle-side positioning data that includes the in-vehicle-side positioning coordinates representing the positioned coordinates and transmits the obtained in-vehicle-side positioning data to the portable terminal device, and the portable terminal device obtains the portable-side positioning data that includes the portable-side positioning coordinates representing the positioned coordinates, selects the in-vehicle-side positioning data and/or the portable-side positioning data based on the positioning environment, and calculates the vehicle position based on the selected positioning data, so that the effect can be obtained that the GPS positioning function for in-vehicle and the GPS positioning function for portable are complemented with each other by selecting the positioning data in accordance with the positioning environment and thus the positioning accuracy when the vehicle is driving can be improved.

Moreover, according to one embodiment of the present invention, the in-vehicle-side positioning data that includes the in-vehicle-side positioning coordinates representing the positioned coordinates is obtained and the obtained in-vehicle-side positioning data is transmitted to the portable terminal device, and the portable terminal device receives the portable-side positioning data that includes the portable-side positioning coordinates representing the positioned coordinates, selects the in-vehicle-side positioning data and/or the portable-side positioning data based on the positioning environment, and calculates the vehicle position based on the selected positioning data, so that the effect can be obtained that the GPS positioning function for in-vehicle is complemented by the GPS positioning function for portable by selecting the positioning data in accordance with the positioning environment and thus the positioning accuracy when the vehicle is driving can be improved.

Furthermore, according to one embodiment of the present invention, the in-vehicle device obtains the in-vehicle-side positioning coordinates representing the positioned coordinates and the in-vehicle-side positioning accuracy representing the accuracy in the positioning, and transmits the obtained in-vehicle-side positioning coordinates and in-vehicle-side positioning accuracy to the portable terminal device, and the portable terminal device obtains the portable-side positioning coordinates representing the positioned coordinates and the portable-side positioning accuracy representing the accuracy in the positioning, and calculates the vehicle position from the in-vehicle-side positioning coordinates and the portable-side positioning coordinates based on the in-vehicle-side positioning accuracy and the portable-side positioning accuracy, so that the effect can be obtained that the GPS positioning function for in-vehicle and the GPS positioning function for portable are complemented with each other by calculating the vehicle position from the in-vehicle-side positioning coordinates and the portable-side positioning coordinates in accordance with the level of the positioning accuracy and thus the positioning accuracy when the vehicle is driving can be improved.

Moreover, according to one embodiment of the present invention, the in-vehicle-side positioning coordinates representing the positioned coordinates and the in-vehicle-side positioning accuracy representing the accuracy in the positioning are obtained, and the portable-side positioning coordinates representing the coordinates positioned by the portable terminal device and the portable-side positioning accuracy representing the accuracy in the positioning are received, and the vehicle position is calculated from the in-vehicle-side positioning coordinates and the portable-side positioning coordinates based on the in-vehicle-side positioning accuracy and the portable-side positioning accuracy, so that the effect can be obtained that the GPS positioning function for in-vehicle is complemented by the GPS positioning function for portable by calculating the vehicle position from the in-vehicle-side positioning coordinates and the portable-side positioning coordinates in accordance with the level of the positioning accuracy and thus the positioning accuracy when the vehicle is driving can be improved.

BRIEF DESCRIPTION OF DRAWINGS

FIG. 16 is a flowchart illustrating an outline of a process procedure performed by a positioning system according to the fourth embodiment.

EXPLANATIONS OF LETTERS OR NUMERALS

Figure 1:
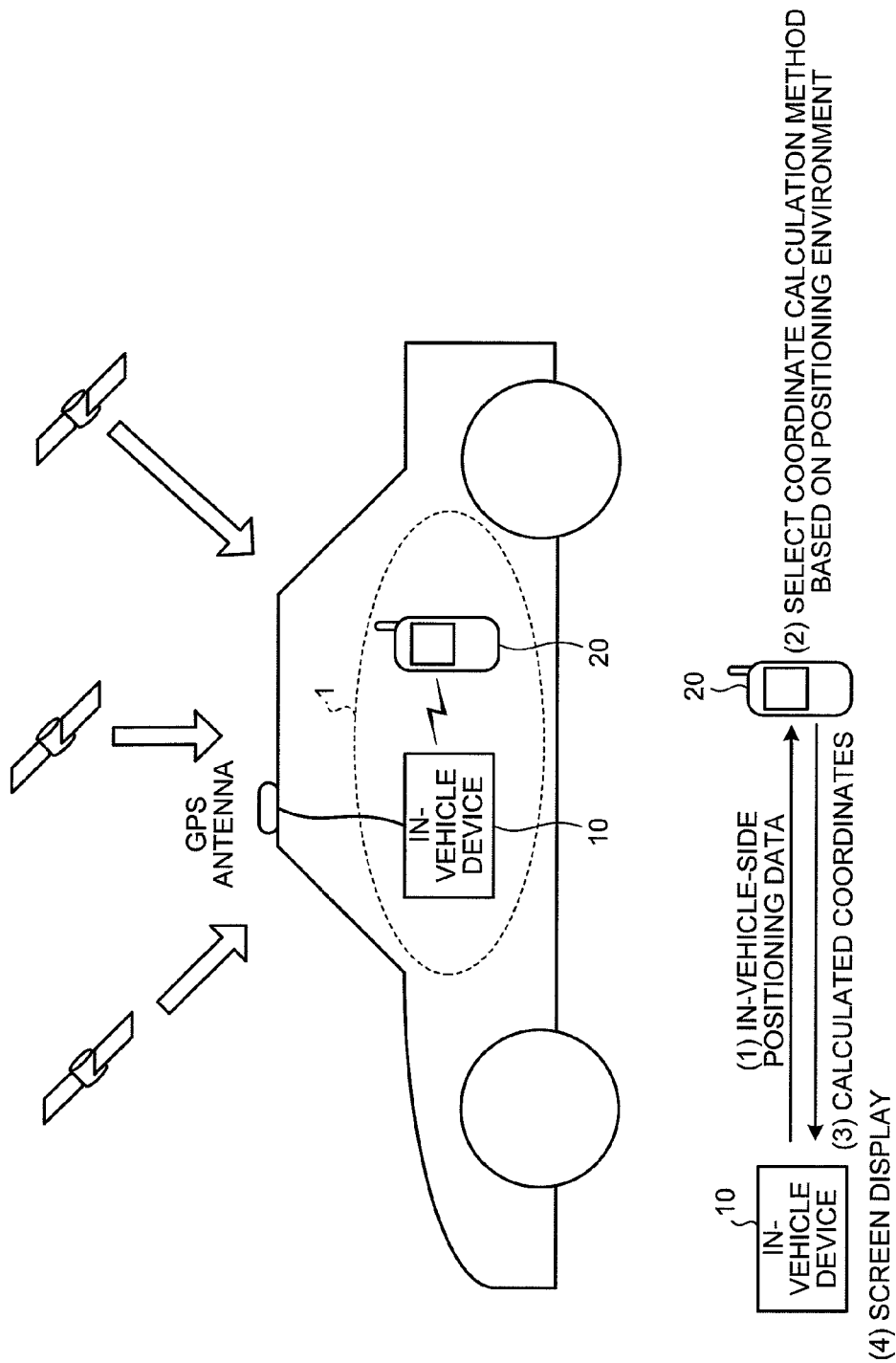
FIG. 1 is a diagram illustrating an outline of a positioning system according to a first embodiment.

1 Positioning system
10, 10a In-vehicle device
11 GPS antenna
12 Display
13 Communication unit
14 Control unit
14a GPS receiving unit
14b Vehicle signal transmitting unit
14c Display processing unit
15 Storage unit
15a Satellite information
20, 20a Portable terminal device
21 GPS antenna
22 Antenna for call
23 Communication unit
24 Control unit
24a GPS receiving unit
24b Auxiliary information receiving unit
24c Calculation method selecting unit
25 Storage unit
25a Satellite information
1a Positioning system
100, 100a In-vehicle device
110 GPS antenna
120 Display
130 Communication unit
140 Control unit
140a GPS receiving unit
140b Display processing unit
150 Storage unit
150a Systematic error information
200, 200a Portable terminal device
210 GPS antenna
220 Antenna for call
230 Communication unit
240 Control unit
240a GPS receiving unit
240b Auxiliary information receiving unit
240c Error correcting unit
250 Storage unit
250a Systematic error information
250b Map information

BEST MODE(S) FOR CARRYING OUT THE INVENTION

Exemplary first to fourth embodiments of a positioning system according to this invention will be explained in detail below with reference to the accompanying drawings. Explanation will be given for a basic configuration of the positioning system in the first embodiment, a case where satellite information is shared by an in-vehicle device and a portable terminal device in the second embodiment, a case where the portable terminal device holds systematic error information to be described later in the third embodiment, and a case where the in-vehicle device also holds the systematic error information in the fourth embodiment. Moreover, in each embodiment to be described below, explanation will be given for a case where a cell phone is used as the portable terminal device; however, a portable terminal device such as a PDA (Personal Digital Assistant) or a laptop computer can also be used.

First Embodiment

FIG. 1 is a diagram illustrating an outline of a positioning system according to the first embodiment. As illustrated in FIG. 1, a positioning system 1 according to the first embodiment includes an in-vehicle device 10 having a GPS (Global Positioning System) positioning function (hereinafter, referred to as "in-vehicle-side GPS function") and a portable terminal device 20 having a GPS positioning function (hereinafter, referred to as "portable-side GPS function").

The in-vehicle-side GPS function has a filter configuration in which only a portion with a high S/N ratio of a satellite radio wave is used, whereas the portable-side GPS function has a filter configuration in which a portion with a low S/N ratio is also used. Therefore, the in-vehicle-side GPS function has a low sensitivity compared with the portable-side GPS function, however, is capable of performing high-speed information processing because the filter configuration is simple and is suitable for positioning when moving at high speed because a positioning cycle can be shortened. On the other hand, the portable-side GPS function has a high sensitivity compared with the in-vehicle-side GPS function, however, the positioning cycle is long because the filter configuration is complex, so that the portable-side GPS function is suitable for the positioning when moving at low speed.

Moreover, the portable-side GPS function is premised on the indoor use, so that the portable-side GPS function has a high sensitivity as described above and is compatible with an assist GPS (AGPS) in which auxiliary information for GPS positioning is received from a server device via a network to be used for the GPS positioning, so that high-accuracy positioning is possible even in a closed environment such as in a vehicle.

Each GPS function performs a positioning process by receiving satellite radio waves from a plurality of GPS satellites, and at this time, a DOP (Dilution Of Precision) value that is a numerical value indicative of accuracy degradation of the GPS positioning can be obtained from a positional relationship between respective GPS satellites. Therefore, this DOP value can be used as a positioning accuracy. In the followings, the positioning accuracy in the in-vehicle device 10 is described as "in-vehicle-side positioning accuracy" and the positioning accuracy in the portable terminal device 20 is described as "portable-side positioning accuracy". Moreover, positioning coordinates calculated by the in-vehicle device 10 are described as "in-vehicle-side positioning coordinates" and the positioning coordinates calculated by the portable terminal device 20 are described as "portable-side positioning coordinates".

Furthermore, as described above, the in-vehicle-side GPS function is suitable for the high-speed movement, whereas the portable-side GPS function is suitable for the low-speed movement. Therefore, when the vehicle stops or when the vehicle speed is low such as immediately after entering the vehicle, the positioning can be performed with higher accuracy by the portable-side GPS function. Moreover, in the case where a person who was using the portable-side GPS function outside the vehicle enters the vehicle with the portable terminal device 20, the portable-side GPS function has already obtained information (satellite information) on orbits and the like of GPS satellites, so that the positioning accuracy of the portable-side GPS function is stable.

Accordingly, in the positioning system 1 according to the first embodiment, the vehicle position is calculated by selecting one of the portable-side GPS function and the in-vehicle-side GPS function or both of the portable-side GPS function and the in-vehicle-side GPS function in accordance with a positioning environment such as an elapsed time in which the portable terminal device 20 is present in the vehicle, the vehicle speed, and the positioning accuracy of each GPS function.

Specifically, the in-vehicle device 10 transmits in-vehicle-side positioning data including the in-vehicle-side positioning coordinates, the in-vehicle-side positioning accuracy, the vehicle speed, and the elapsed time in which the portable terminal device 20 is present in the vehicle to the portable terminal device 20 (see (1) in FIG. 1). On the other hand, the portable terminal device 20 uses portable-side positioning data including the portable-side positioning coordinates and the portable-side positioning accuracy and the received in-vehicle-side positioning data and selects a coordinate calculation method for calculating the vehicle position based on the positioning environment (see (2) in FIG. 1). Then, after calculating the final vehicle position, the calculated corrected coordinates are transmitted to the in-vehicle device 10 (see (3) in FIG. 1), and a screen including the vehicle position is displayed by using this corrected coordinates in the in-vehicle device 10 (see (4) in FIG. 1).

In this manner, in the positioning system 1 according to the first embodiment, the vehicle position is calculated from the in-vehicle-side positioning coordinates and the portable-side positioning coordinates in accordance with the positioning environment such as the elapsed time in which the portable terminal device 20 is present in the vehicle, the vehicle speed, and the positioning accuracy of each GPS function, so that the positioning accuracy when the vehicle is driving can be improved. Moreover, it is possible to reduce a multipath problem that causes a positioning error by reflection of radio waves on a building and the like.

Figure 2:
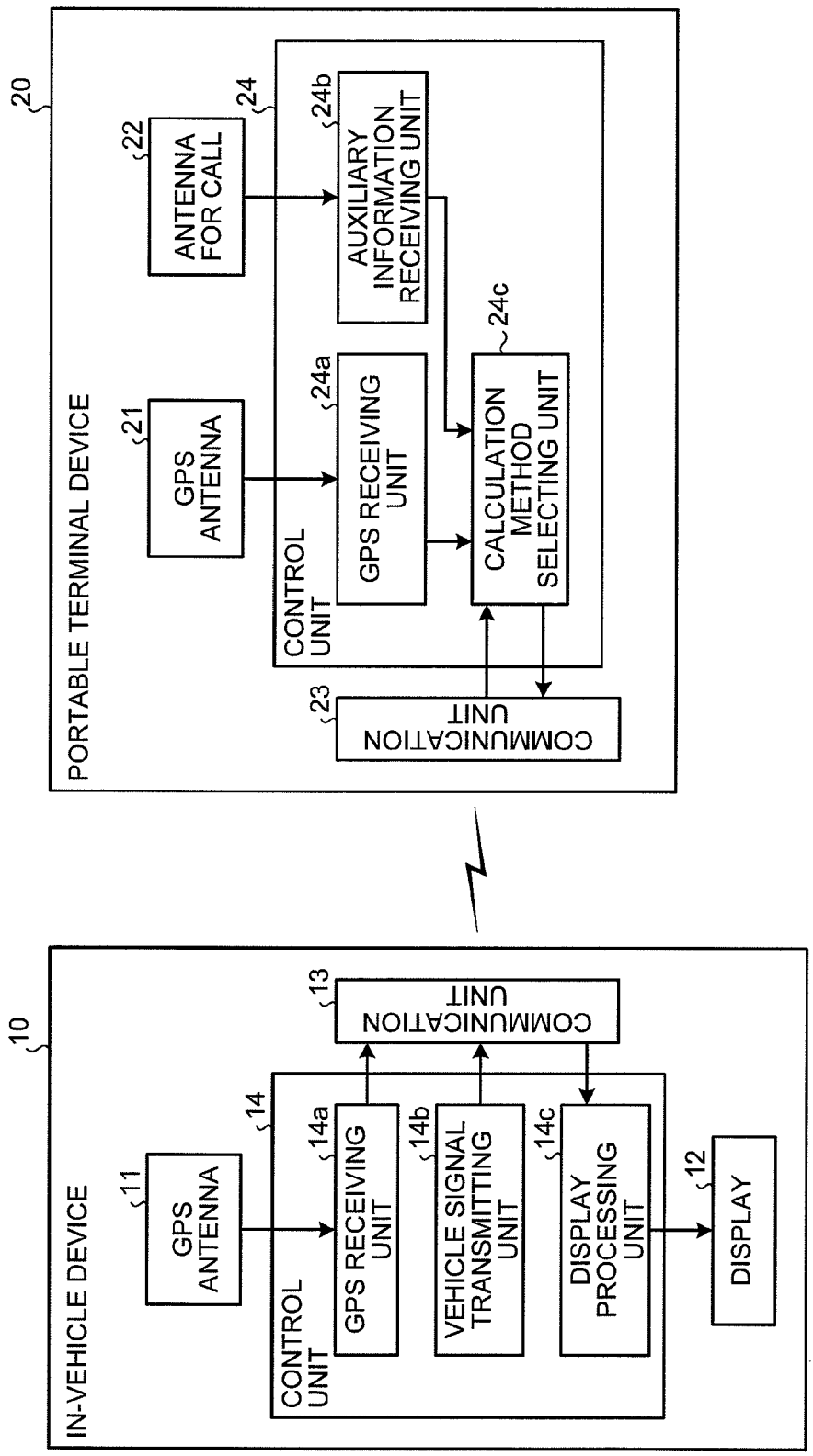
FIG. 2 is a block diagram illustrating configurations of an in-vehicle device and a portable terminal device according to the first embodiment.

Next, configurations of the in-vehicle device 10 and the portable terminal device 20 illustrated in FIG. 1 are explained with reference to FIG. 2. FIG. 2 is a block diagram illustrating the configurations of the in-vehicle device 10 and the portable terminal device 20 according to the first embodiment. In FIG. 2, only components necessary for explaining the characteristics of the positioning system 1 according to the first embodiment are illustrated.

As illustrated in FIG. 2, the in-vehicle device 10 includes a GPS antenna 11, a display 12, a communication unit 13, and a control unit 14. The control unit 14 further includes a GPS receiving unit 14a, a vehicle signal transmitting unit 14b, and a display processing unit 14c. The GPS antenna 11 is an antenna for receiving a radio wave from a GPS satellite and transfers the received signal to the GPS receiving unit 14a. The display 12 is a display device such as a touch panel display device and displays display data to be output from the display processing unit 14c.

The communication unit 13 is a processing unit that performs a wireless communication with the portable terminal device 20. This communication unit 13 performs bidirectional data transmission and reception with the portable terminal device 20, for example, based on the communication standard of Bluetooth (registered trademark). The first embodiment illustrates a case where the communication between the in-vehicle device 10 and the portable terminal device 20 is performed by the wireless communication; however, the communication may be performed by a wired communication.

The control unit 14 is a processing unit that performs a process of transmitting the in-vehicle-side positioning data including the in-vehicle-side positioning coordinates, the in-vehicle-side positioning accuracy, the vehicle speed, and the elapsed time in which the portable terminal device 20 is present in the vehicle that are obtained by the in-vehicle device 10 to the portable terminal device 20 via the communication unit 13, and displaying the corrected coordinates (vehicle position) received from the portable terminal device 20 on the display 12.

The GPS receiving unit 14a is a processing unit that performs a process of obtaining the in-vehicle-side positioning coordinates, the in-vehicle-side positioning accuracy, and the like based on the signal from the GPS antenna 11 and outputting the obtained in-vehicle-side positioning coordinates, in-vehicle-side positioning accuracy, and the like to the communication unit 13 in a state included in the in-vehicle-side positioning data. In the first embodiment, explanation is given for a case in which the DOP value is used as the in-vehicle-side positioning accuracy; however, the number of GPS satellites captured may be used instead of the DOP value. The in-vehicle-side positioning data includes a positioning time.

The vehicle signal transmitting unit 14b is a processing unit that performs a process of transmitting the vehicle speed obtained by a not-shown vehicle speed sensor or the like and the elapsed time in which the portable terminal device 20 is present in the vehicle to the portable terminal device 20 via the communication unit 13 in a state included in the in-vehicle-side positioning data. As the elapsed time in which the portable terminal device 20 is present in the vehicle, the elapsed time from establishment of the communication between the communication unit 13 of the in-vehicle device 10 and a communication unit 23 of the portable terminal device 20 can be used, for example. Alternatively, it is possible to detect a passenger to enter the vehicle from opening and closing of a door, an ignition key operation, or the like and use the elapsed time from the detected vehicle-entering time.

The display processing unit 14c is a processing unit that performs a process of setting the corrected coordinates received from the portable terminal device 20 as the vehicle position and synthesizing an icon corresponding to the vehicle position with map information and the like to display to the display 12.

The portable terminal device 20 includes a GPS antenna 21, an antenna for call 22, the communication unit 23, and a control unit 24. The control unit 24 further includes a GPS receiving unit 24a, an auxiliary information receiving unit 24b, and a calculation method selecting unit 24c.

The GPS antenna 21 is an antenna for receiving a radio wave from a GPS satellite and transfers the received signal to the GPS receiving unit 24a. The antenna for call 22 is an antenna used for communication with a base station at the time of a call or a data communication and transfers the auxiliary information for the GPS positioning in the received signal to the auxiliary information receiving unit 24b.

The communication unit 23 is a processing unit that performs a wireless communication with the in-vehicle device 10, and performs bidirectional data transmission and reception with the in-vehicle device 10, for example, based on the communication standard of Bluetooth (registered trademark). The first embodiment illustrates a case where the communication between the in-vehicle device 10 and the portable terminal device 20 is performed by the wireless communication; however, the communication may be performed by a wired communication.

The control unit 24 is a processing unit that performs a process of using the portable-side positioning data including the portable-side positioning coordinates and the portable-side positioning accuracy that are obtained via the GPS antenna 21 and the antenna for call 22 and the in-vehicle-side positioning data received from the in-vehicle device 10 to calculate the vehicle position by using one of the portable-side positioning coordinates and the in-vehicle-side positioning coordinates or both of the portable-side positioning coordinates and the in-vehicle-side positioning coordinates in accordance with the positioning environment, and transmitting the calculated vehicle position to the in-vehicle device 10.

The GPS receiving unit 24a is a processing unit that performs a process of obtaining the portable-side positioning coordinates, the portable-side positioning accuracy, and the like based on the signal from the GPS antenna 21 and outputting the portable-side positioning data including the obtained portable-side positioning coordinates, portable-side positioning accuracy, and the like to the calculation method selecting unit 24c. In the first embodiment, explanation is given for a case in which the DOP value is used as the portable-side positioning accuracy; however, the number of GPS satellites captured may be used instead of the DOP value. The portable-side positioning data includes the positioning time.

The auxiliary information receiving unit 24b is a processing unit that performs a process of receiving the auxiliary information for the assist GPS based on the signal from the antenna for call 22 and outputting the received auxiliary information to the calculation method selecting unit 24c. The auxiliary information includes schematic orbiting information on an available GPS satellite, detailed orbiting information on GPS satellites that are in charge of the current position, and the like.

The calculation method selecting unit 24c is a processing unit that compares the portable-side positioning data obtained based on the outputs from the GPS receiving unit 24a and the auxiliary information receiving unit 24b and the in-vehicle-side positioning data received via the communication unit 23 and performs a selection process of a calculation method in accordance with the positioning environment. Specifically, this calculation method selecting unit 24c selects the calculation method for calculating the vehicle position in accordance with the elapsed time in which the portable terminal device 20 is present in the vehicle, the vehicle speed, and the positioning accuracy of each GPS function. A detailed process procedure of the calculation method selecting unit 24c will be described later with reference to FIG. 3 to FIG. 5. Moreover, this calculation method selecting unit 24c is also a processing unit that performs a process of transmitting the vehicle position calculated by using the selected calculation method to the in-vehicle device 10 via the communication unit 23.

Figure 3:
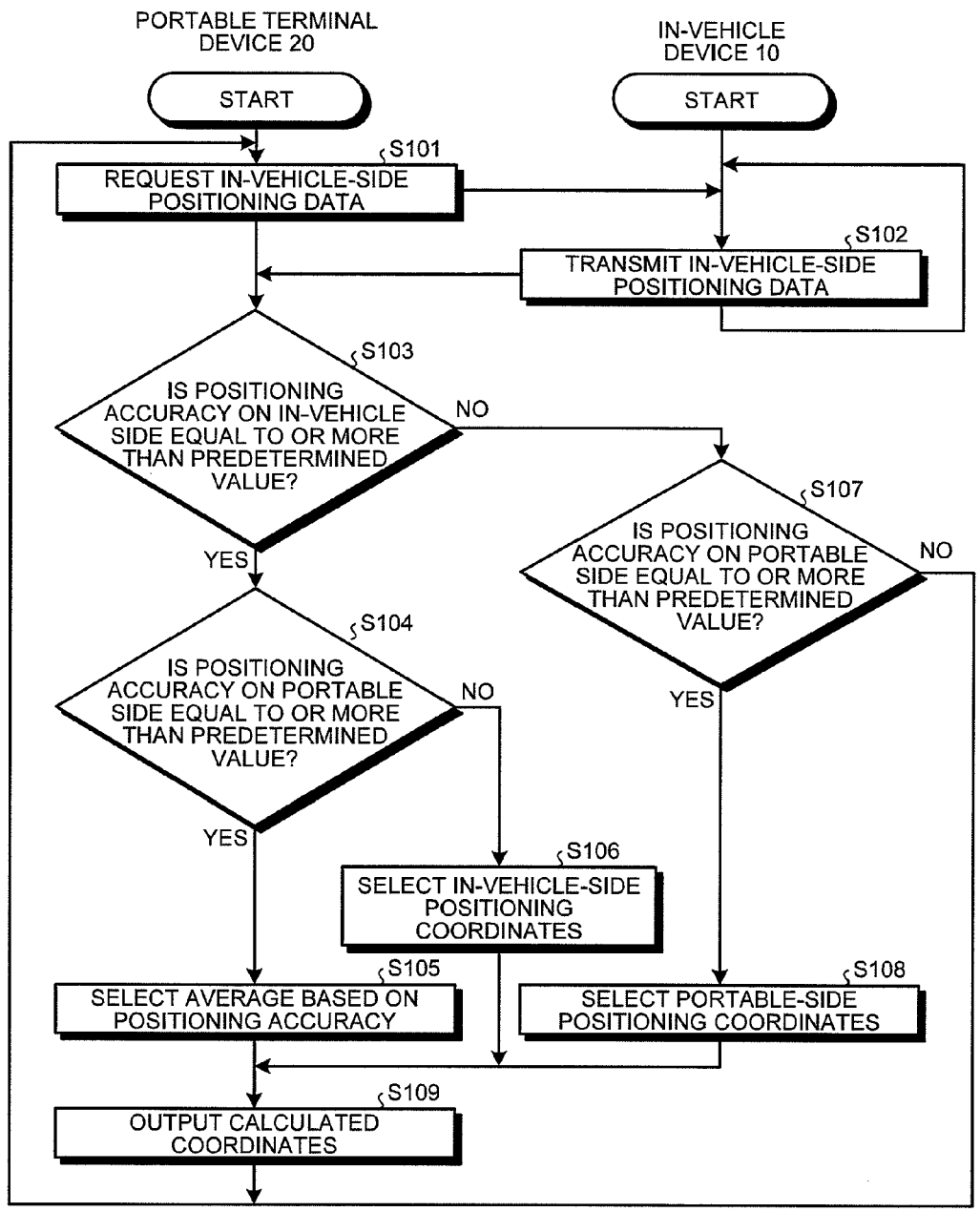
FIG. 3 is a flowchart illustrating a process procedure of a selection process based on a positioning accuracy.

Next, explanation is given for a case where the calculation method selecting unit 24c performs the selection process based on the positioning accuracy with reference to FIG. 3. FIG. 3 is a flowchart illustrating a process procedure of the selection process based on the positioning accuracy. In FIG. 3, the process procedure after establishment of the connection between the communication unit 13 of the in-vehicle device 10 and the communication unit 23 of the portable terminal device 20 is illustrated.

As illustrated in FIG. 3, when the portable terminal device 20 requests the in-vehicle-side positioning data (Step S101), the in-vehicle device 10 transmits the in-vehicle-side positioning data to the portable terminal device 20 (Step S102). Next, the portable terminal device 20 determines whether the in-vehicle side is in a positioned state based on the in-vehicle-side positioning accuracy included in the in-vehicle-side positioning data (Step S103). Then, when the in-vehicle side is in the positioned state (Yes at Step S103), it is determined whether the portable side is in the positioned state based on the portable-side positioning accuracy included in the portable-side positioning data (Step S104).

Then, when the portable side is in the positioned state (Yes at Step S104), the average of the in-vehicle-side positioning coordinates included in the in-vehicle-side positioning data and the portable-side positioning coordinates included in the portable-side positioning data is set as calculated coordinates (Step S105). Variation of the averaging process at Step S105 is explained.

The averaging process can select any of a simple average and a weighted average. When the simple average is selected, the average is calculated by dividing the sum of the in-vehicle-side positioning coordinates and the portable-side positioning coordinates by 2. On the other hand, when the weighted average is selected, the average is calculated by the weighting using each positioning accuracy.

Specifically, when the DOP value is used as each positioning accuracy, this DOP value has a value of 1 or larger and the accuracy is the best when the DOP value is 1. Therefore, when the value obtained by subtracting 1 from the DOP value is expressed as "$\Delta D$", each of the positioning coordinates are "P", "$\Delta D$" and "P" on the in-vehicle side are "$\Delta Dc$" and "Pc", and "$\Delta D$" and "P" on the portable side are "$\Delta Dp$" and "Pp", the weighted average to be obtained is expressed by an equation "weighted average=$Pcx(\Delta Dp/(\Delta Dc+\Delta Dp))+Ppx(\Delta Dc/(\Delta Dc+\Delta Dp))$".

Returning to the explanation of the flowchart, when the portable side is not in the positioned state at Step S104 (No at Step S104), the in-vehicle-side positioning coordinates are set as the calculated coordinates (Step S106). When the in-vehicle side is not in the positioned state at Step S103 (No at Step S103), it is determined whether the portable side is in the positioned state (Step S107), and when the portable side is in the positioned state (Yes at Step S107), the portable-side positioning coordinates are set as the calculated coordinates (Step S108). Then, the calculated coordinates calculated at Step S105, Step S106, and Step S108 are output (Step S109), and the process from Step S101 is repeated.

When the determination condition at Step S107 is not satisfied (No at Step S107), both of the in-vehicle side and the portable side are not in the positioned state, so that the process from Step S101 is repeated without performing the process at Step S109.

Figure 4:
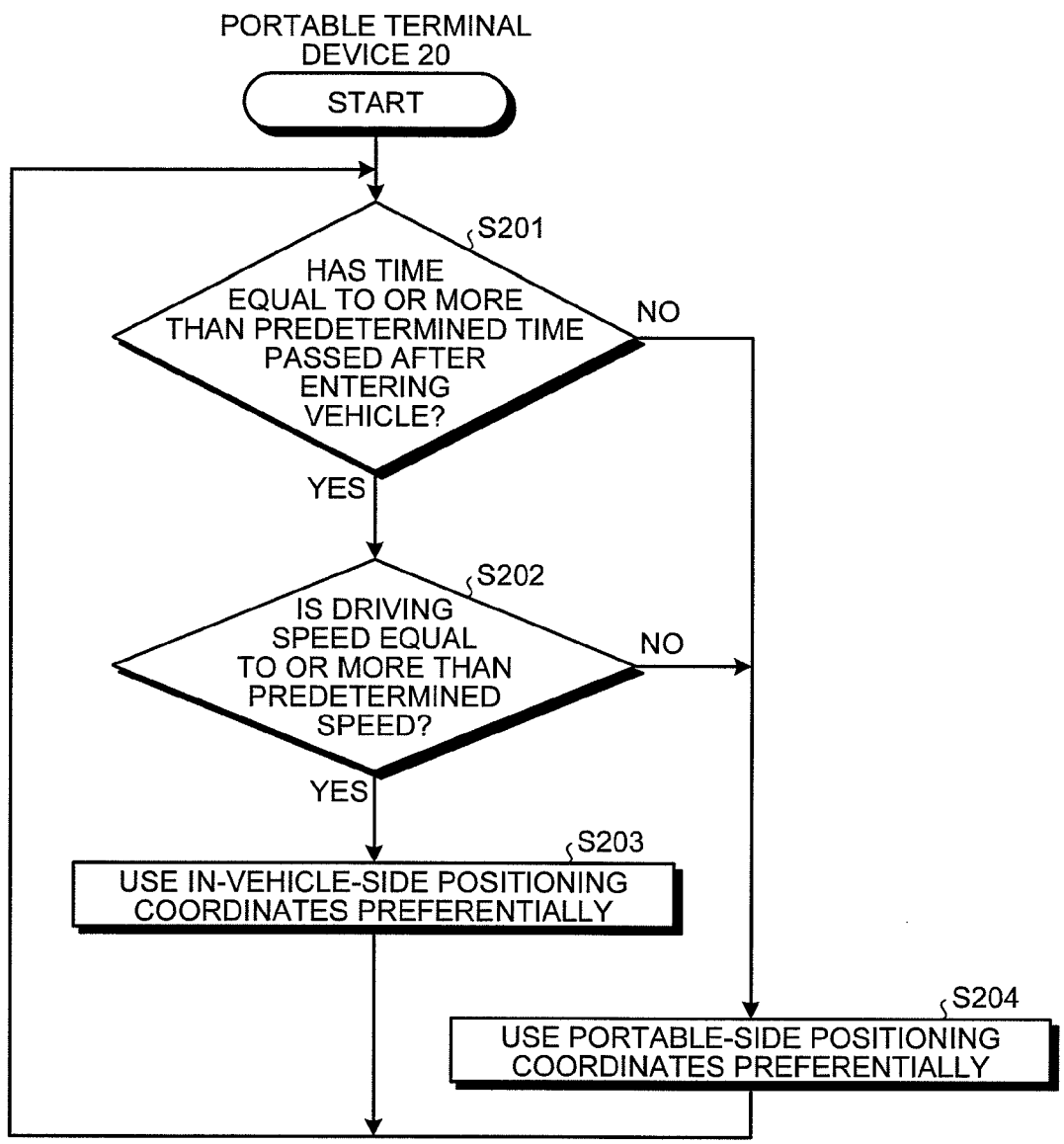
FIG. 4 is a flowchart illustrating a process procedure of the selection process based on an elapsed time in which the portable terminal device is present in a vehicle and a driving speed.

Next, explanation is given for a case where the calculation method selecting unit 24c performs the selection process based on the elapsed time in which the portable terminal device 20 is present in the vehicle and the driving speed with reference to FIG. 4. FIG. 4 is a flowchart illustrating a process procedure of the selection process based on the elapsed time in which the portable terminal device 20 is present in the vehicle and the driving speed. As illustrated in FIG. 4, it is determined whether the time equal to or more than a predetermined time has elapsed after entering the vehicle (Step S201), and when the time equal to or more than the predetermined time has elapsed (Yes at Step S201), it is determined whether the driving speed is equal to or more than a predetermined speed (Step S202).

Then, when the driving speed is equal to or more than the predetermined speed (Yes at Step S202), the in-vehicle-side positioning coordinates are used in preference to the portable-side positioning coordinates (Step S203), and the process from Step S201 is repeated. On the other hand, when the determination condition at Step S201 is not satisfied (No at Step S201) and when the determination condition at Step S202 is not satisfied (No at Step S202), the portable-side positioning coordinates are used in preference to the in-vehicle-side positioning coordinates (Step S204), and the process from Step S201 is repeated.

Figure 5:
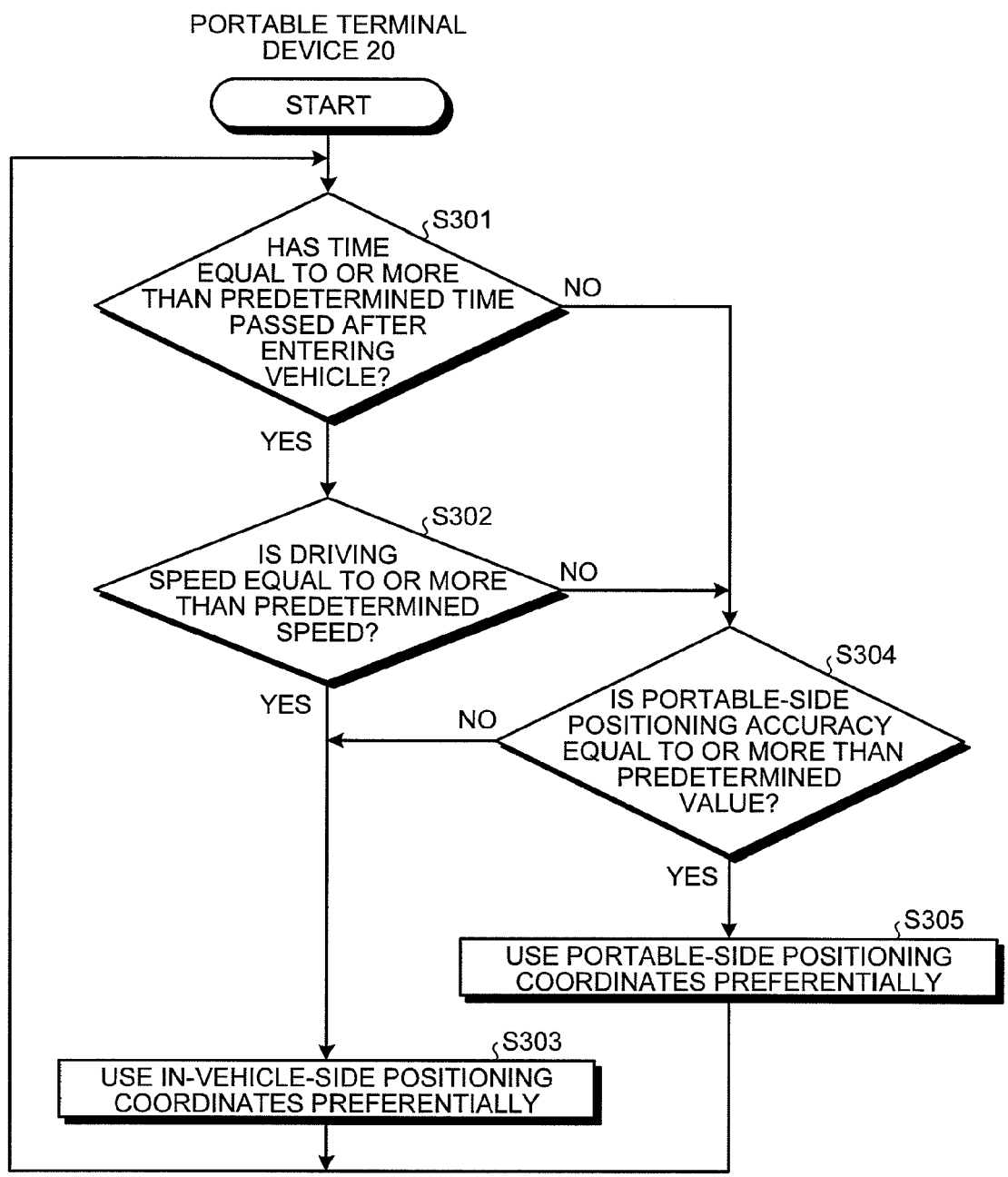
FIG. 5 is a flowchart illustrating a process procedure of the selection process based on the elapsed time in which the portable terminal device is present in the vehicle, the driving speed, and the positioning accuracy.

In FIG. 4, although a case is illustrated in which the positioning accuracy is not used as the determination reference, the positioning accuracy may be used as the determination reference in addition to the elapsed time in which the portable terminal device 20 is present in the vehicle and the driving speed. FIG. 5 is a flowchart illustrating a process procedure of the selection process based on the elapsed time in which the portable terminal device 20 is present in the vehicle, the driving speed, and the positioning accuracy. As illustrated in FIG. 5, it is determined whether the time equal to or more than a predetermined time has elapsed after entering the vehicle (Step S301), and when the time equal to or more than the predetermined time has elapsed (Yes at Step S301), it is determined whether the driving speed is equal to or more than a predetermined speed (Step S302).

Then, when the driving speed is equal to or more than the predetermined speed (Yes at Step S302), the in-vehicle-side positioning coordinates are used in preference to the portable-side positioning coordinates (Step S303), and the process from Step S301 is repeated. On the other hand, when the determination condition at Step S301 is not satisfied (No at Step S301) and the determination condition at Step S302 is not satisfied (No at Step S302), it is determined whether the portable-side positioning accuracy is equal to or more than a predetermined value (Step S304).

Then, when the portable-side positioning accuracy is equal to or more than the predetermined value (Yes at Step S304), the portable-side positioning coordinates are used in preference to the in-vehicle-side positioning coordinates (Step S305), and the process from Step S301 is repeated. On the other hand, when the portable-side positioning accuracy is less than the predetermined value (No at Step S304), the in-vehicle-side positioning coordinates are used in preference to the portable-side positioning coordinates (Step S303), and the process from Step S301 is repeated.

As described above, according to the first embodiment, the positioning system is configured such that the in-vehicle device obtains the in-vehicle-side positioning data that includes the in-vehicle-side positioning coordinates representing the positioned coordinates and transmits the obtained in-vehicle-side positioning data to the portable terminal device, and the portable terminal device obtains the portable-side positioning data that includes the portable-side positioning coordinates representing the positioned coordinates, selects the in-vehicle-side positioning data and/or the portable-side positioning data based on the positioning environment, and calculates the vehicle position based on the selected positioning data, so that the GPS positioning function for in-vehicle and the GPS positioning function for portable are complemented with each other by selecting the positioning data in accordance with the positioning environment, and thus the positioning accuracy when the vehicle is driving can be improved.

In the above described first embodiment, a case is illustrated in which selection of the positioning data and calculation of the vehicle position are performed on the portable terminal device side; however, the selection of the positioning data and the calculation of the vehicle position may be performed on the in-vehicle device side. For example, the in-vehicle device can be configured to obtain the in-vehicle-side positioning data that includes the in-vehicle-side positioning coordinates representing the positioned coordinates, receive the portable-side positioning data that includes the portable-side positioning coordinates representing the coordinates positioned by the portable terminal device, select the in-vehicle-side positioning data and/or the portable-side positioning data based on the positioning environment, and calculate the vehicle position based on the selected positioning data.

Second Embodiment

Figure 6:
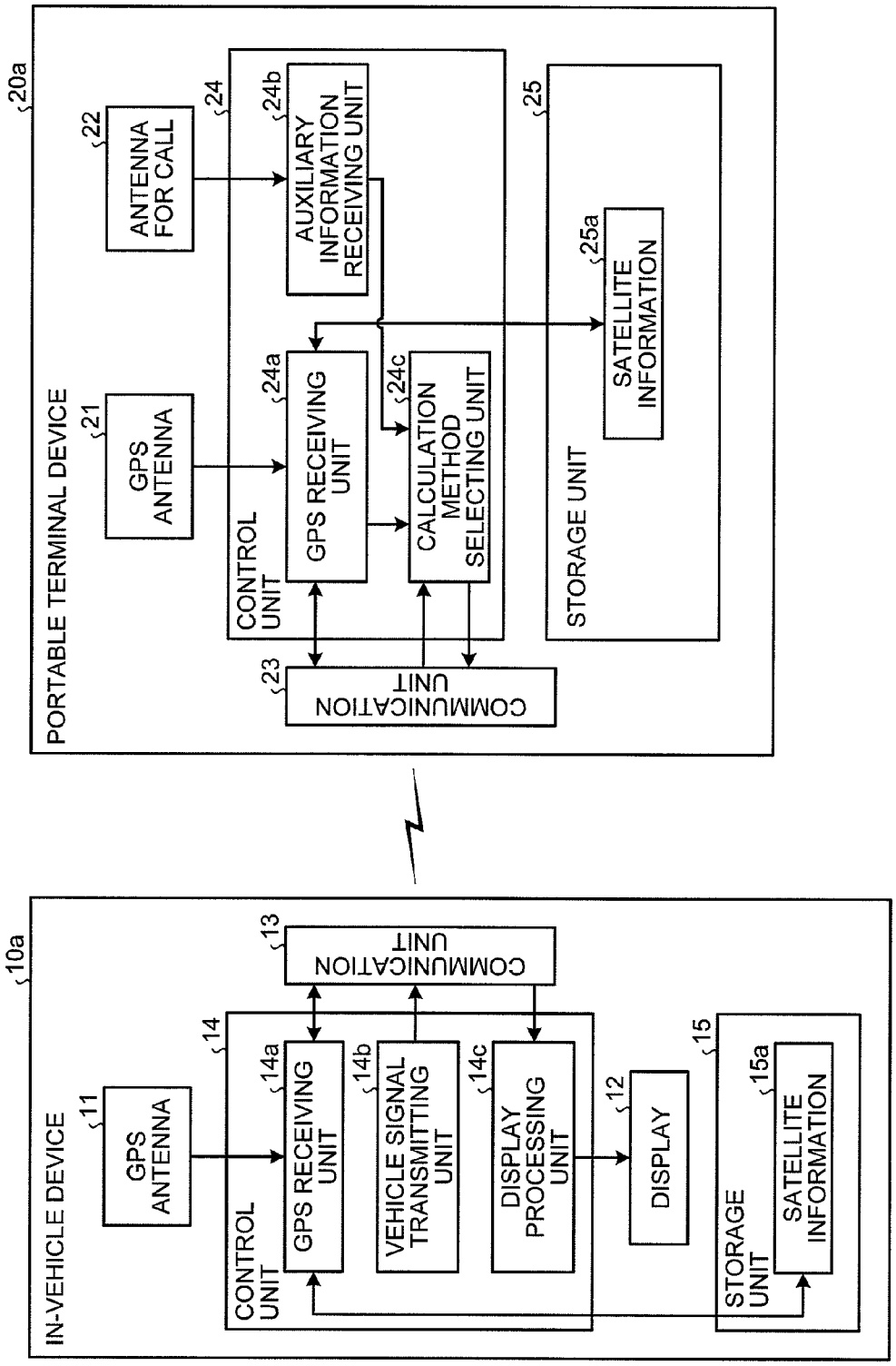
FIG. 6 is a block diagram illustrating configurations of an in-vehicle device and a portable terminal device according to a second embodiment.

In the second embodiment, explanation is given for a case where the satellite information is shared by the in-vehicle device and the portable terminal device. FIG. 6 is a block diagram illustrating configurations of an in-vehicle device 10a and a portable terminal device 20a according to the second embodiment. In FIG. 6, components different from the first embodiment are given new reference numerals and the same components are given the same reference numerals as in the first embodiment (see FIG. 2). In the followings, explanation common to the first embodiment is omitted or briefly explained.

The in-vehicle device 10a further includes a storage unit 15 in which satellite information 15a is stored. The storage unit 15 is a storage unit composed of a storage device such as an HDD (Hard Disk Drive) or a RAM (Random Access Memory). The satellite information 15a is information on orbits and the like of GPS satellites, and can be obtained via the GPS antenna 11 and the GPS receiving unit 14a or can also be obtained via the GPS antenna 21 and the antenna for call 22 of the portable terminal device 20a. In the case of obtaining the satellite information 15a from the portable terminal device 20a, the GPS receiving unit 14a requests the portable terminal device 20a via the communication unit 13 and the GPS receiving unit 24a of the portable terminal device 20a responds to this request.

The portable terminal device 20a further includes a storage unit 25 in which satellite information 25a is stored. The storage unit 25 is a storage unit composed of a storage device such as an HDD (Hard Disk Drive) or a RAM (Random Access Memory). The satellite information 25a is information on orbits and the like of GPS satellites, and can be obtained via the GPS antenna 21 and the GPS receiving unit 24a or can also be obtained via the GPS antenna 11 of the in-vehicle device 10a. In the case of obtaining the satellite information 25a from the in-vehicle device 10a, the GPS receiving unit 24a requests the in-vehicle device 10a via the communication unit 23 and the GPS receiving unit 14a of the in-vehicle device 10a responds to this request. The satellite information 25a can also be obtained via the antenna for call 22 and the auxiliary information receiving unit 24b.

Figure 7:
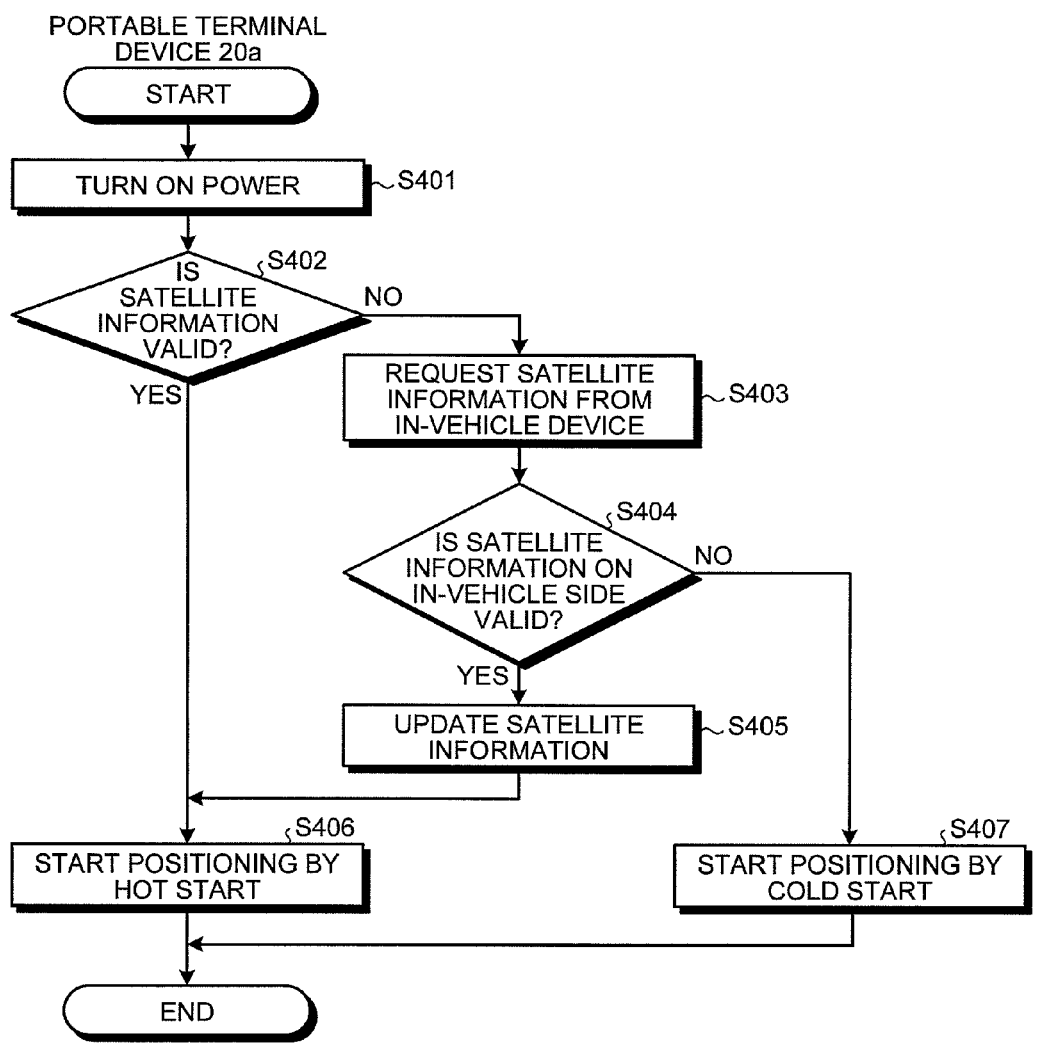
FIG. 7 is a flowchart illustrating a process procedure of a positioning starting process by the portable terminal device.

Next, a process procedure of a positioning starting process by the portable terminal device 20a is explained with reference to FIG. 7. FIG. 7 is a flowchart illustrating the process procedure of the positioning starting process by the portable terminal device 20a. As illustrated in FIG. 7, when the power is turned on (Step S401), it is determined whether the satellite information 25a is valid (Step S402), and when the satellite information 25a is valid (Yes at Step S402), the positioning is started by a hot start (Step S406) and the process ends. Whether the satellite information 25a is valid is determined based on the elapsed time from the time at which the satellite information 25a is obtained, or the like. The hot start indicates to start the positioning immediately by using the current satellite information 25a.

When the satellite information 25a is not valid (No at Step S402), the portable terminal device 20a requests the satellite information 15a from the in-vehicle device 10a (Step S403) and determines whether the satellite information 15a on the in-vehicle side is valid (Step S404). Then, when the satellite information 15a on the in-vehicle side is valid (Yes at Step S404), the satellite information 25a is updated by using the satellite information 15a on the in-vehicle side (Step S405), and the positioning is started by the hot start (Step S406) and the process ends.

On the other hand, when the satellite information 15a on the in-vehicle side is not valid (No at Step S404), the positioning is started by a cold start (Step S407) and the process ends. The cold start indicates to start the positioning after the satellite information 25a is updated to valid information.

Figure 8:
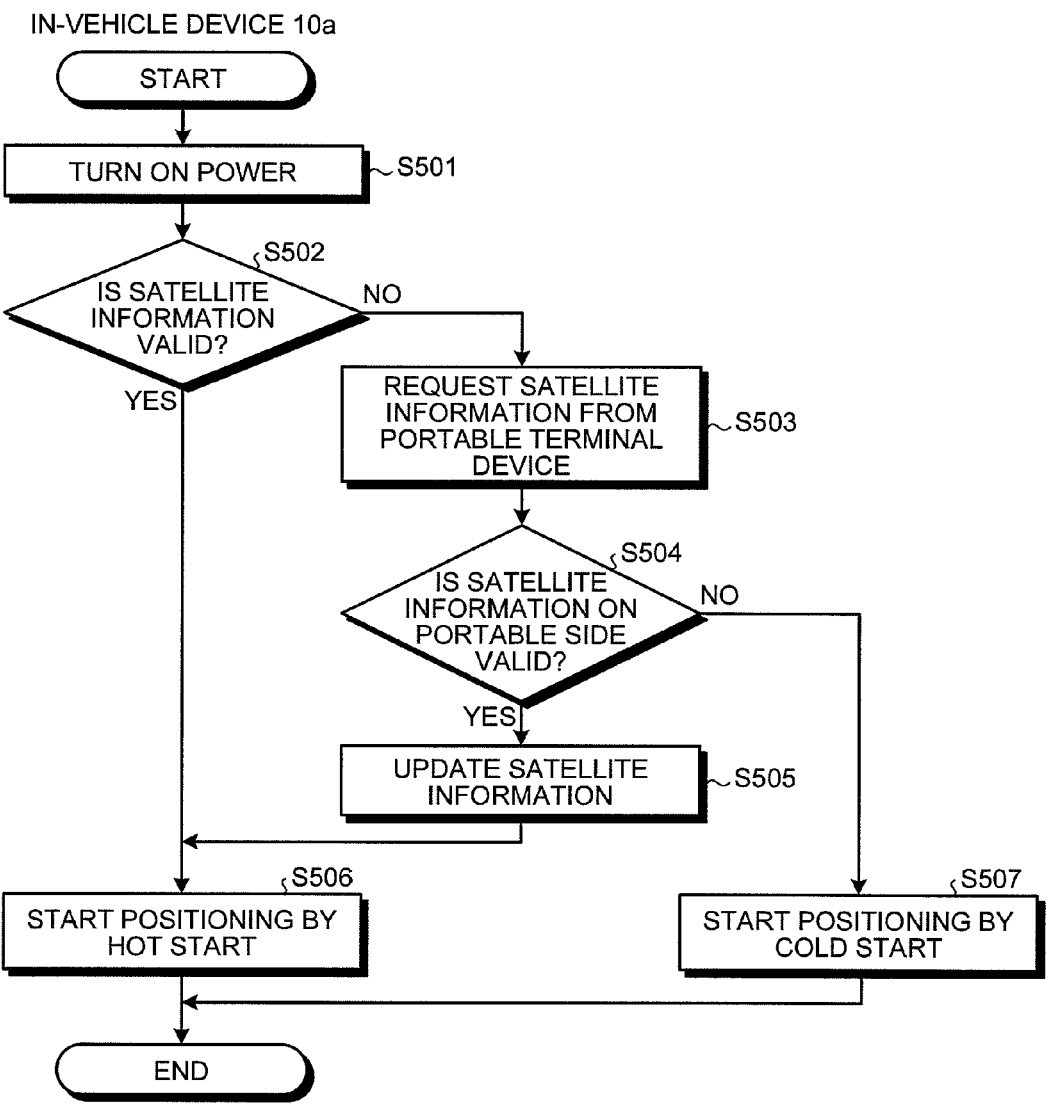
FIG. 8 is a flowchart illustrating a process procedure of the positioning starting process by the in-vehicle device.

Next, a process procedure of the positioning starting process by the in-vehicle device 10a is explained with reference to FIG. 8. FIG. 8 is a flowchart illustrating the process procedure of the positioning starting process by the in-vehicle device 10a. As illustrated in FIG. 8, when the power is turned on (Step S501), it is determined whether the satellite information 15a is valid (Step S502), and when the satellite information 15a is valid (Yes at Step S502), the positioning is started by the hot start (Step S506) and the process ends. Whether the satellite information 15a is valid is determined based on the elapsed time from the time at which the satellite information 15a is obtained, or the like. The hot start indicates to start the positioning immediately by using the current satellite information 15a.

When the satellite information 15a is not valid (No at Step S502), the in-vehicle device 10a requests the satellite information 25a from the portable terminal device 20a (Step S503) and determines whether the satellite information 25a on the portable side is valid (Step S504). Then, when the satellite information 25a on the portable side is valid (Yes at Step S504), the satellite information 15a is updated by using the satellite information 25a on the portable side (Step S505), and the positioning is started by the hot start (Step S506) and the process ends.

On the other hand, when the satellite information 25a on the portable side is not valid (No at Step S504), the positioning is started by the cold start (Step S507) and the process ends. The cold start indicates to start the positioning after the satellite information 15a is updated to valid information.

In this manner, according to the second embodiment, because the in-vehicle device and the portable terminal device share the satellite information, even when there is no valid satellite information in a local device, valid satellite information can be obtained, so that the positioning can be started promptly. Moreover, even when the satellite information cannot be obtained temporarily after starting the positioning, valid satellite information can be obtained, so that the positioning can be continued.

Third Embodiment

Figure 9:
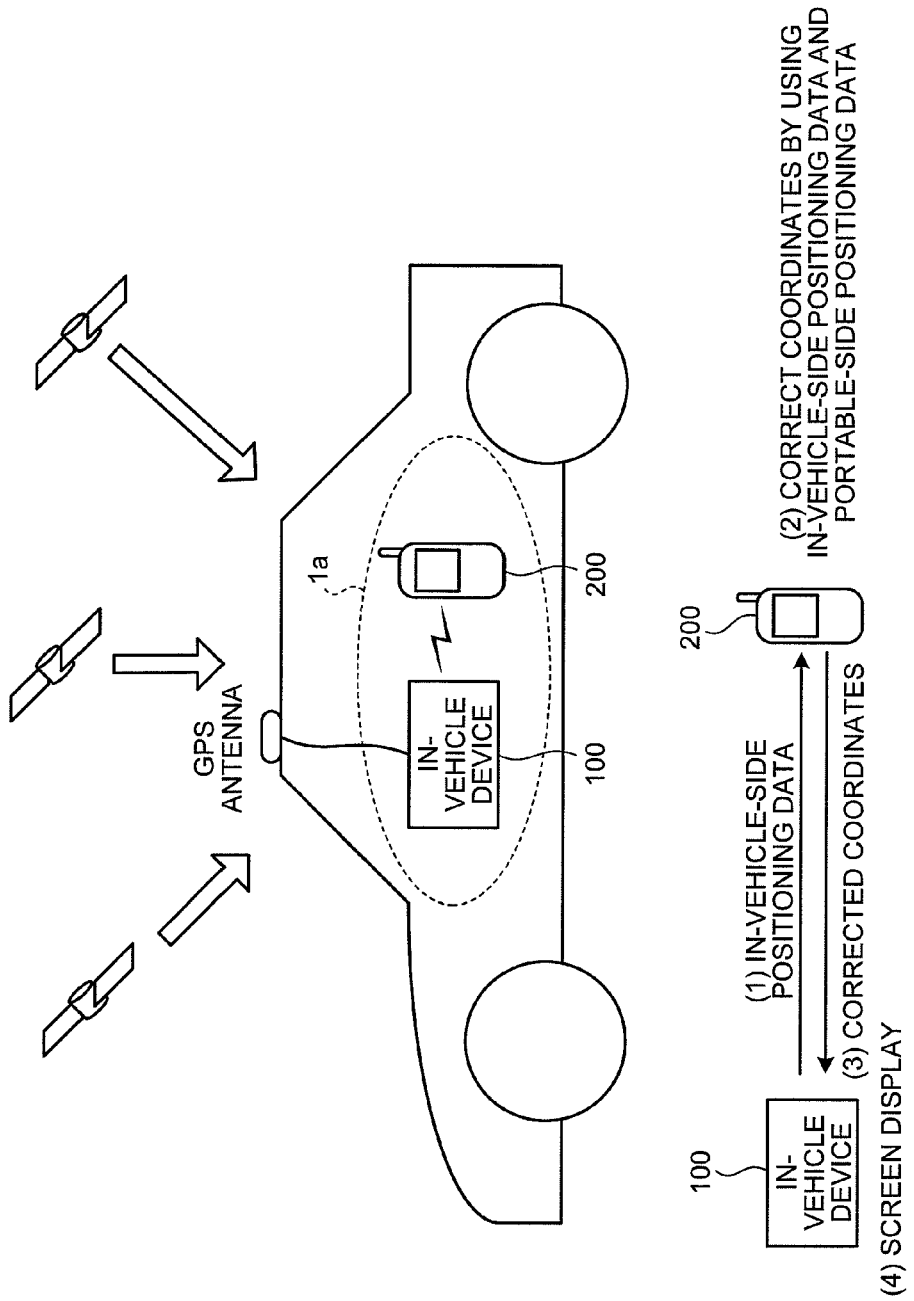
FIG. 9 is a diagram illustrating an outline of a positioning system according to a third embodiment.

In the third embodiment, explanation is given for a case where the portable terminal device holds the systematic error information to be described later. FIG. 9 is a diagram illustrating an outline of a positioning system according to the third embodiment. As illustrated in FIG. 9, a positioning system 1a according to the third embodiment includes an in-vehicle device 100 having the GPS (Global Positioning System) positioning function (hereinafter, referred to as "in-vehicle-side GPS function") and a portable terminal device 200 having the GPS positioning function (hereinafter, referred to as "portable-side GPS function").

The in-vehicle-side GPS function has a filter configuration in which only a portion with a high S/N ratio of a satellite radio wave is used, whereas the portable-side GPS function has a filter configuration in which a portion with a low S/N ratio is also used. Therefore, the in-vehicle-side GPS function has a low sensitivity compared with the portable-side GPS function, however, is capable of performing high-speed information processing because the filter configuration is simple and is suitable for the positioning when moving at high speed because a positioning cycle can be shortened. On the other hand, the portable-side GPS function has a high sensitivity compared with the in-vehicle-side GPS function, however, the positioning cycle is long because the filter configuration is complex, so that the portable-side GPS function is suitable for the positioning when moving at low speed.

Moreover, the portable-side GPS function is premised on indoor use, so that the portable-side GPS function has a high sensitivity as described above and is compatible with the assist GPS (ALPS) in which the auxiliary information for the GPS positioning is received from a server device via a network to be used for the GPS positioning, so that high-accuracy positioning is possible even in a closed environment such as in the vehicle.

Each GPS function performs the positioning process by receiving satellite radio waves from a plurality of GPS satellites, and at this time, the DOP (Dilution Of Precision) value that is a numerical value indicative of accuracy degradation of the GPS positioning can be obtained from a positional relationship between respective GPS satellites. Therefore, this DOP value can be used as the positioning accuracy. In the followings, the positioning accuracy in the in-vehicle device 100 is described as "in-vehicle-side positioning accuracy" and the positioning accuracy in the portable terminal device 200 is described as "portable-side positioning accuracy". Moreover, the positioning coordinates calculated by the in-vehicle device 100 are described as "in-vehicle-side positioning coordinates" and the positioning coordinates calculated by the portable terminal device 200 are described as "portable-side positioning coordinates".

In the positioning system 1a according to the third embodiment, the vehicle position is calculated from the in-vehicle-side positioning coordinates and the portable-side positioning coordinates based on the positioning accuracy of each GPS function. Specifically, the in-vehicle device 100 transmits the in-vehicle-side positioning data including the in-vehicle-side positioning coordinates and the in-vehicle-side positioning accuracy to the portable terminal device 200 (see (1) in FIG. 9). On the other hand, the portable terminal device 200 uses the portable-side positioning data including the portable-side positioning coordinates and the portable-side positioning accuracy and the received in-vehicle-side positioning data to correct both of the positioning coordinates (see (2) in FIG. 9). Then, after calculating the final vehicle position, the calculated corrected coordinates are transmitted to the in-vehicle device 100 (see (3) in FIG. 9), and a screen including the vehicle position is displayed by using this corrected coordinates in the in-vehicle device 100 (see (4) in FIG. 9).

In this manner, in the positioning system 1a according to the third embodiment, the vehicle position is calculated from the in-vehicle-side positioning coordinates and the portable-side positioning coordinates based on the positioning accuracy of each GPS function, so that the positioning error included in both of the in-vehicle-side positioning coordinates and the portable-side positioning coordinates can be mutually corrected, enabling to improve the positioning accuracy. Moreover, it is possible to reduce a multipath problem that causes the positioning error by reflection of radio waves on a building and the like.

The positioning system 1a records an error of each of the positioning coordinates while associating it with an orientation or an area and uses it for correction of the vehicle position, and this point will be described later. Moreover, in the third embodiment, explanation is given for a case of using the portable terminal device 200 compatible with the assist GPS; however, the portable terminal device 200 that is not compatible with the assist GPS may be used.

Figure 10:
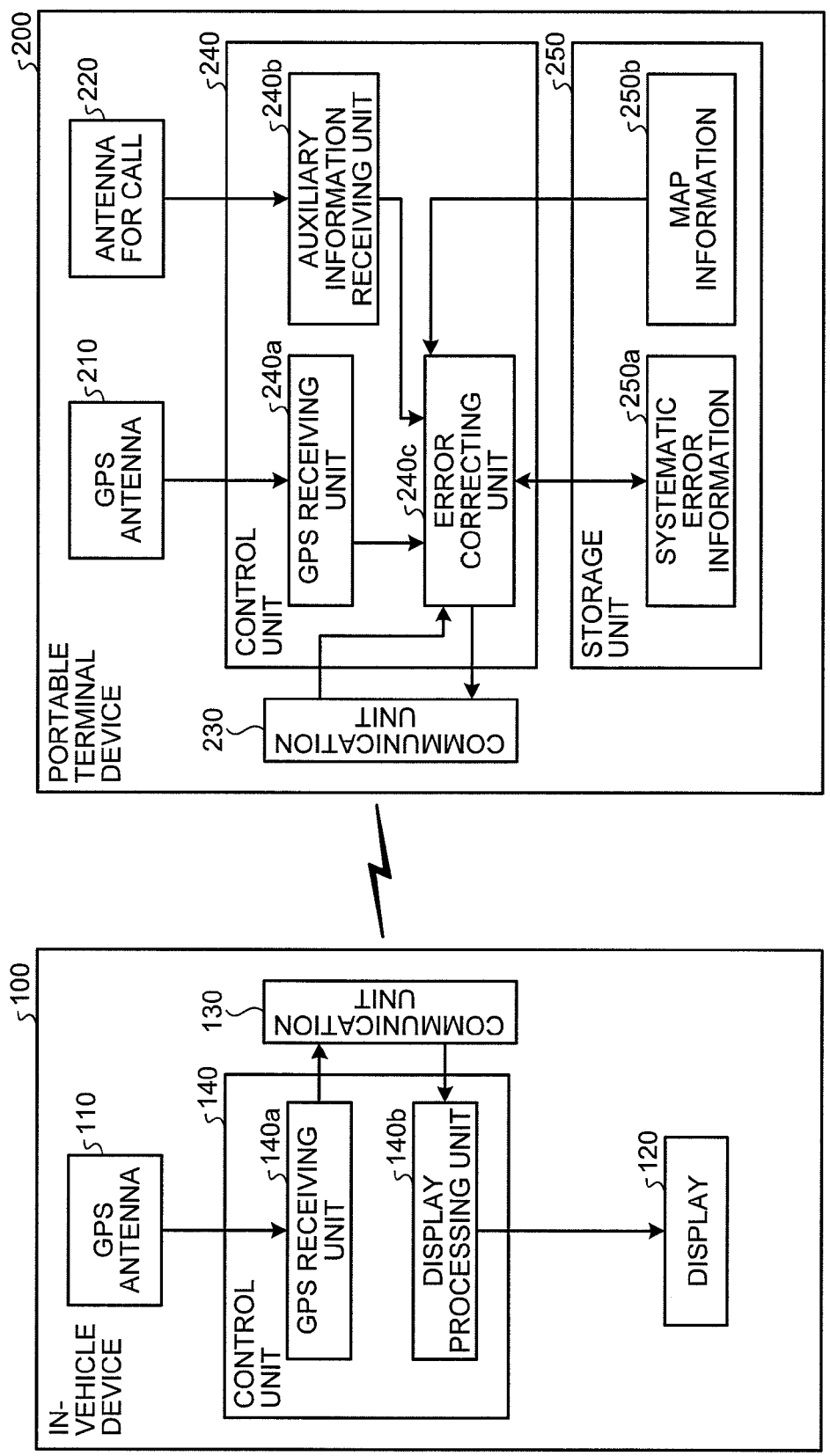
FIG. 10 is a block diagram illustrating configurations of an in-vehicle device and a portable terminal device according to the third embodiment.

Next, configurations of the in-vehicle device 100 and the portable terminal device 200 illustrated in FIG. 9 are explained with reference to FIG. 10. FIG. 10 is a block diagram illustrating the configurations of the in-vehicle device 100 and the portable terminal device 200 according to the third embodiment. In FIG. 10, only components necessary for explaining the characteristics of the positioning system 1a according to the third embodiment are illustrated.

As illustrated in FIG. 10, the in-vehicle device 100 further includes a GPS antenna 110, a display 120, a communication unit 130, and a control unit 140. The control unit 140 further includes a GPS receiving unit 140a and a display processing unit 140b. The GPS antenna 110 is an antenna for receiving a radio wave from a GPS satellite and transfers the received signal to the GPS receiving unit 140a. The display 120 is a display device such as a touch panel display device, and displays display data to be output from the display processing unit 140b.

The communication unit 130 is a processing unit that performs a wireless communication with the portable terminal device 200. This communication unit 130 performs bidirectional data transmission and reception with the portable terminal device 200, for example, based on the communication standard of Bluetooth (registered trademark). The third embodiment illustrates a case where the communication between the in-vehicle device 100 and the portable terminal device 200 is performed by the wireless communication; however, the communication may be performed by a wired communication.

The control unit 140 is a processing unit that performs a process of transmitting the in-vehicle-side positioning data including the in-vehicle-side positioning coordinates and the in-vehicle-side positioning accuracy that are obtained by the in-vehicle device 100 to the portable terminal device 200 via the communication unit 130 and displaying the corrected coordinates (vehicle position) received from the portable terminal device 200 on the display 120.

The GPS receiving unit 140a is a processing unit that performs a process of obtaining the in-vehicle-side positioning coordinates, the in-vehicle-side positioning accuracy, and the like based on the signal from the GPS antenna 110 and outputting the in-vehicle-side positioning data including the obtained in-vehicle-side positioning coordinates, in-vehicle-side positioning accuracy, and the like to the communication unit 130. In the third embodiment, explanation is given for a case in which the DOP value is used as the in-vehicle-side positioning accuracy; however, the number of GPS satellites captured may be used instead of the DOP value. The in-vehicle-side positioning data includes the positioning time.

The display processing unit 140b is a processing unit that performs a process of setting the corrected coordinates received from the portable terminal device 200 as the vehicle position and synthesizing an icon corresponding to the vehicle position with map information and the like to display to the display 120.

The portable terminal device 200 includes a GPS antenna 210, an antenna for call 220, a communication unit 230, a control unit 240, and a storage unit 250. The control unit 240 further includes a GPS receiving unit 240a, an auxiliary information receiving unit 240b, and an error correcting unit 240c, and the storage unit 250 stores a systematic error information 250a and a map information 250b.

The GPS antenna 210 is an antenna for receiving a radio wave from a GPS satellite and transfers the received signal to the GPS receiving unit 240a. The antenna for call 220 is an antenna used for communication with a base station at the time of a call or a data communication and transfers the auxiliary information for the GPS positioning in the received signal to the auxiliary information receiving unit 240b.

The communication unit 230 is a processing unit that performs a wireless communication with the in-vehicle device 100, and performs bidirectional data transmission and reception with the in-vehicle device 100, for example, based on the communication standard of Bluetooth (registered trademark). The third embodiment illustrates a case where the communication between the in-vehicle device 100 and the portable terminal device 200 is performed by the wireless communication; however, the communication may be performed by a wired communication.

The control unit 240 is a processing unit that performs a process of correcting an error of the positioning coordinates by using the portable-side positioning data including the portable-side positioning coordinates and the portable-side positioning accuracy that are obtained via the GPS antenna 210 and the antenna for call 220 and the in-vehicle-side positioning data received from the in-vehicle device 100 and transmitting the corrected coordinates to the in-vehicle device 100.

The GPS receiving unit 240a is a processing unit that performs a process of obtaining the portable-side positioning coordinates, the portable-side positioning accuracy, and the like based on the signal from the GPS antenna 210 and outputting the portable-side positioning data including the obtained portable-side positioning coordinates, portable-side positioning accuracy, and the like to the error correcting unit 240c. In the third embodiment, explanation is given for a case in which the DOP value is used as the portable-side positioning accuracy; however, the number of GPS satellites captured may be used instead of the DOP value. The portable-side positioning data includes the positioning time.

The auxiliary information receiving unit 240b is a processing unit that performs a process of receiving the auxiliary information for the assist GPS based on the signal from the antenna for call 220 and outputting the received auxiliary information to the error correcting unit 240c. The auxiliary information includes schematic orbiting information on an available GPS satellite, detailed orbiting information on GPS satellites that are in charge of the current position, and the like.

The error correcting unit 240c is a processing unit that performs a process of comparing the portable-side positioning data obtained based on the outputs from the GPS receiving unit 240a and the auxiliary information receiving unit 240b and the in-vehicle-side positioning data received via the communication unit 230 and correcting an error included in each positioning data by mutually correcting the error. This error correcting unit 240c is also a processing unit that performs a process of accumulating the systematic error indicating an error having a given tendency for each orientation or each area as a systematic error information 250a by performing map matching process using the map information 250b and correcting each positioning data by using the accumulated systematic error information 250a.

The map matching process indicates a process of, for example, estimating a road on which the vehicle is driving in view of a travelling direction and the like when the calculated current position is not on a road and correcting the current position onto the estimated road based on layout information on roads included in the map information 250b.

The systematic error for each orientation includes, for example, one attributed to an individual difference between devices and shows a tendency of having more positioning errors in a specific orientation in the GPS positioning in some cases. The systematic error for each area includes one attributed to the difference between an earth ellipsoid that the map used in the map information 250b conforms to and an earth ellipsoid that the GPS positioning conforms to. Because a map of Japan conforms to the "TOKYO Datum", the positioning error tends to be larger as the location is farther from Tokyo.

The storage unit 250 is a storage unit composed of a storage device such as an HDD (Hard Disk Drive) or a RAM (Random Access Memory) and stores the systematic error information 250a and the map information 250b. The systematic error information 250a is information in which the systematic error for each orientation or each area of the in-vehicle-side positioning coordinates and the portable-side positioning coordinates is accumulated. Moreover, this systematic error information 250a is used when the error correcting unit 240c corrects each of the positioning coordinates in a specific orientation or a specific area. The map information 250b is the layout information on roads and buildings and is used when the error correcting unit 240c performs the map matching process.

Figure 11:
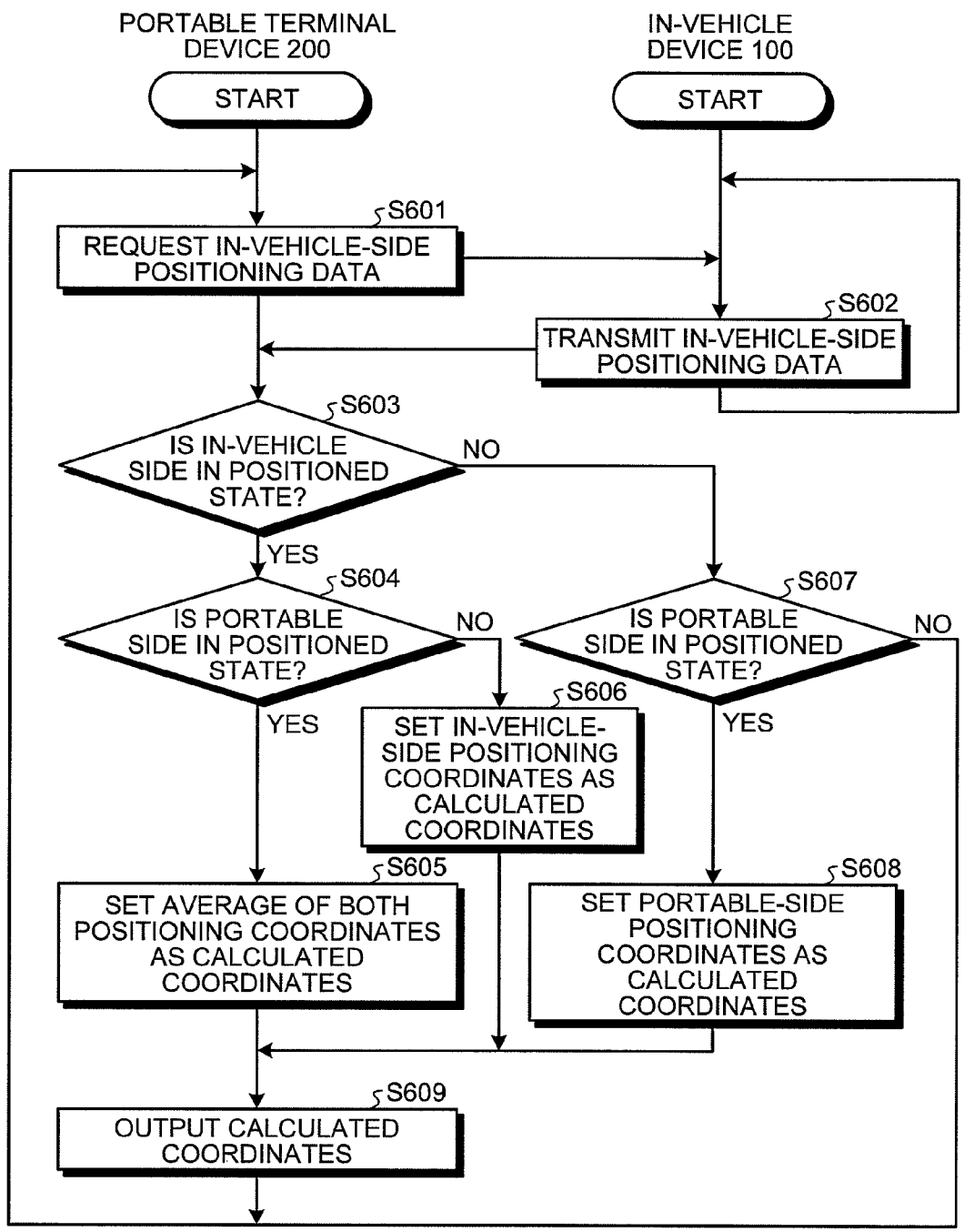
FIG. 11 is a flowchart illustrating an outline of a process procedure performed by the positioning system according to the third embodiment.

Next, explanation is given for an outline of a process procedure performed by the positioning system 1a according to the third embodiment with reference to FIG. 11. FIG. 11 is a flowchart illustrating the outline of the process procedure performed by the positioning system according to the third embodiment. In FIG. 11, the process procedure after establishment of the connection between the communication unit 130 of the in-vehicle device 100 and the communication unit 230 of the portable terminal device 200 is illustrated.

As illustrated in FIG. 11, when the portable terminal device 200 requests the in-vehicle-side positioning data (Step S601), the in-vehicle device 100 transmits the in-vehicle-side positioning data to the portable terminal device 200 (Step S602). Next, the portable terminal device 200 determines whether the in-vehicle side is in the positioned state based on the in-vehicle-side positioning accuracy included in the in-vehicle-side positioning data (Step S603). Then, when the in-vehicle side is in the positioned state (Yes at Step S603), it is determined whether the portable side is in the positioned state based on the portable-side positioning accuracy included in the portable-side positioning data (Step S604).

Then, when the portable side is in the positioned state (Yes at Step S604), the average of the in-vehicle-side positioning coordinates included in the in-vehicle-side positioning data and the portable-side positioning coordinates included in the portable-side positioning data is set as the calculated coordinates (Step S605). Variation of the averaging process at Step S605 is explained.

The averaging process can select any of the simple average and the weighted average. When the simple average is selected, the average is calculated by dividing the sum of the in-vehicle-side positioning coordinates and the portable-side positioning coordinates by 2. On the other hand, when the weighted average is selected, the average is calculated by the weighting using each positioning accuracy.

Specifically, when the DOP value is used as each positioning accuracy, this DOP value has a value of 1 or larger and the accuracy is the best when the DOP value is 1. Therefore, when the value obtained by subtracting 1 from the DOP value is expressed as "$\Delta D$", each of the positioning coordinates are "P", "$\Delta D$" and "P" on the in-vehicle side are "$\Delta Dc$" and "Pc", and "$\Delta D$" and "P" on the portable side are "$\Delta Dp$" and "Pp", the weighted average to be obtained is expressed by an equation "weighted average=$Pcx(\Delta Dp/(\Delta Dc+\Delta Dp))+Ppx(\Delta Dc/(\Delta Dc+\Delta Dp))$".

Returning to the explanation of the flowchart, when the portable side is not in the positioned state at Step S604 (No at Step S604), the in-vehicle-side positioning coordinates are set as the calculated coordinates (Step S606). When the in-vehicle side is not in the positioned state at Step S603 (No at Step S603), it is determined whether the portable side is in the positioned state (Step S607), and when the portable side is in the positioned state (Yes at Step S607), the portable-side positioning coordinates are set as the calculated coordinates (Step S608). Then, the calculated coordinates calculated at Step S605, Step S606, or Step S608 are output (Step S609), and the process from Step S601 is repeated.

When the determination condition at Step S607 is not satisfied (No at Step S607), both of the in-vehicle side and the portable side are not in the positioned state, so that the process from Step S601 is repeated without performing the process at Step S609.

Figure 12:
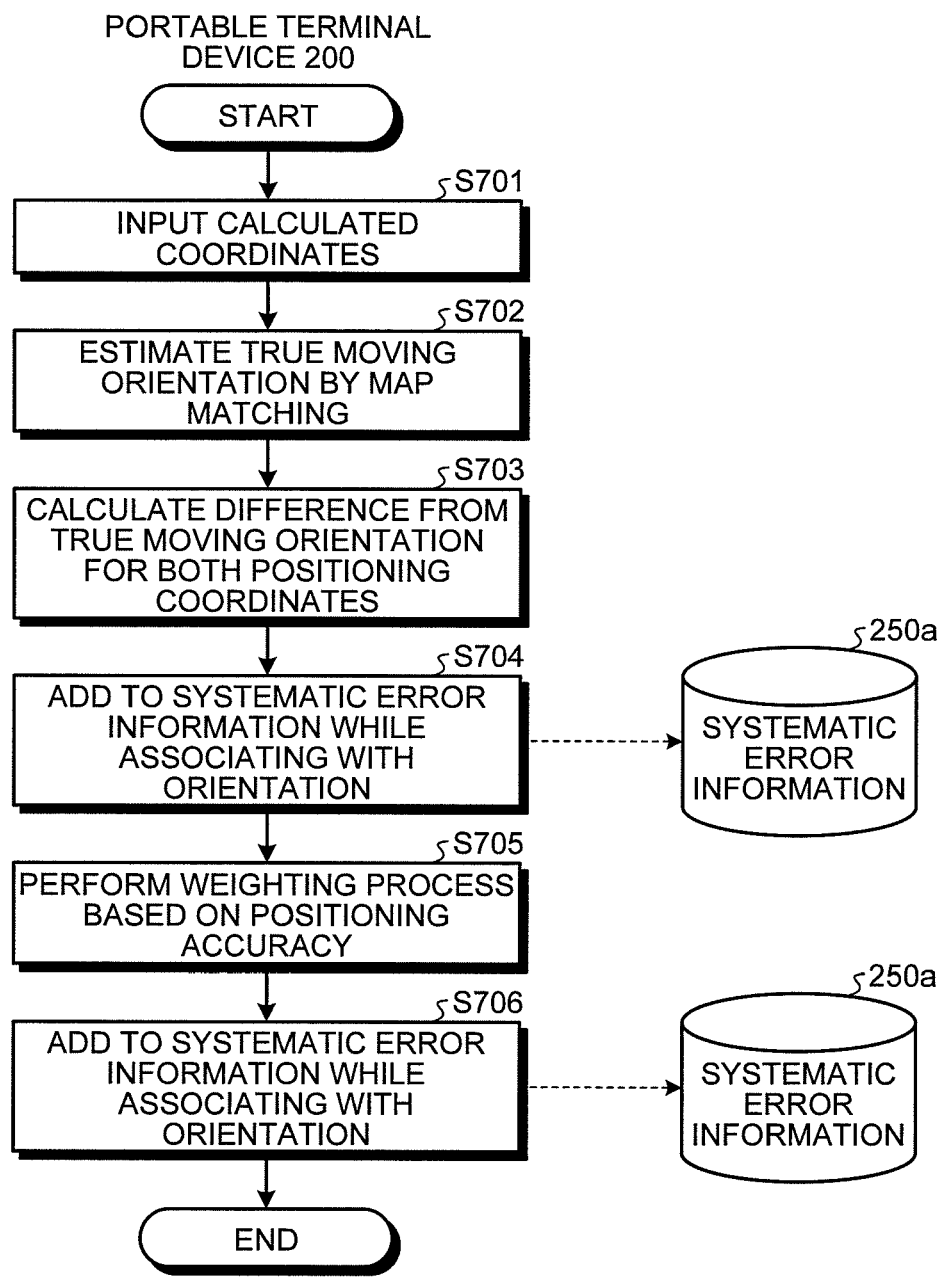
FIG. 12 is a flowchart illustrating an accumulation process procedure of systematic error information pertaining to an orientation.
Figure 13:
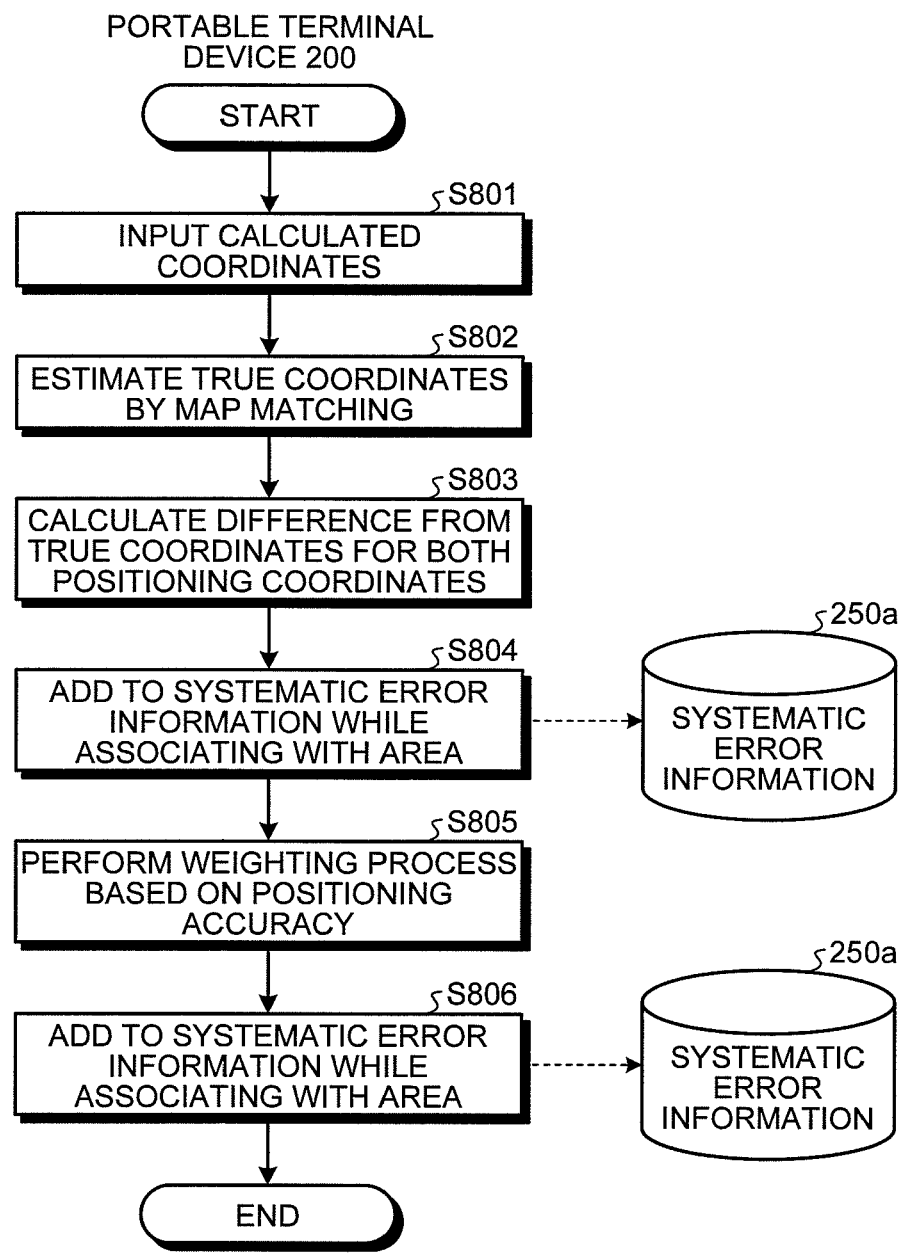
FIG. 13 is a flowchart illustrating an accumulation process procedure of systematic error information pertaining to an area.

Next, explanation is given for a process procedure of accumulating the systematic error information 250a by the error correcting unit 240c of the portable terminal device 200 with reference to FIG. 12 and FIG. 13. FIG. 12 is a flowchart illustrating an accumulation process procedure of the systematic error information 250a pertaining to the orientation. FIG. 13 is a flowchart illustrating an accumulation process procedure of the systematic error information 250a pertaining to the area (area). FIG. 12 and FIG. 13 illustrate the procedures of accumulating the systematic error with the calculated coordinates output at Step S609 in FIG. 11 as input data.

First, the accumulation process procedure of the systematic error information pertaining to the orientation is explained. As illustrated in FIG. 12, when the calculated coordinates are input (Step S701), the true moving orientation is estimated by the map matching using the map information 250b (Step S702). Then, the difference between the orientation obtained from the in-vehicle-side positioning coordinates and the portable-side positioning coordinates and the true moving orientation is calculated (Step S703) to be added to the systematic error information 250a while being associated with the orientation (Step S704). Moreover, the weighting process is performed on the difference from the true moving orientation based on each positioning accuracy (Step S705) to be added to the systematic error information 250a while being associated with the orientation (Step S706) and the process ends.

Next, the accumulation process procedure of the systematic error information pertaining to the area (area) is explained. As illustrated in FIG. 13, when the calculated coordinates are input (Step S801), the true coordinates are estimated by the map matching using the map information 250b (Step S802). Then, the difference between the in-vehicle-side positioning coordinates and the portable-side positioning coordinates and the true coordinates is calculated (Step S803) to be added to the systematic error information 250a while being associated with the area (Step S804). Moreover, the weighting process is performed on the difference from the true coordinates based on each positioning accuracy (Step S805) to be added to the systematic error information 250a while being associated with the area (Step S806) and the process ends.

Figure 14:
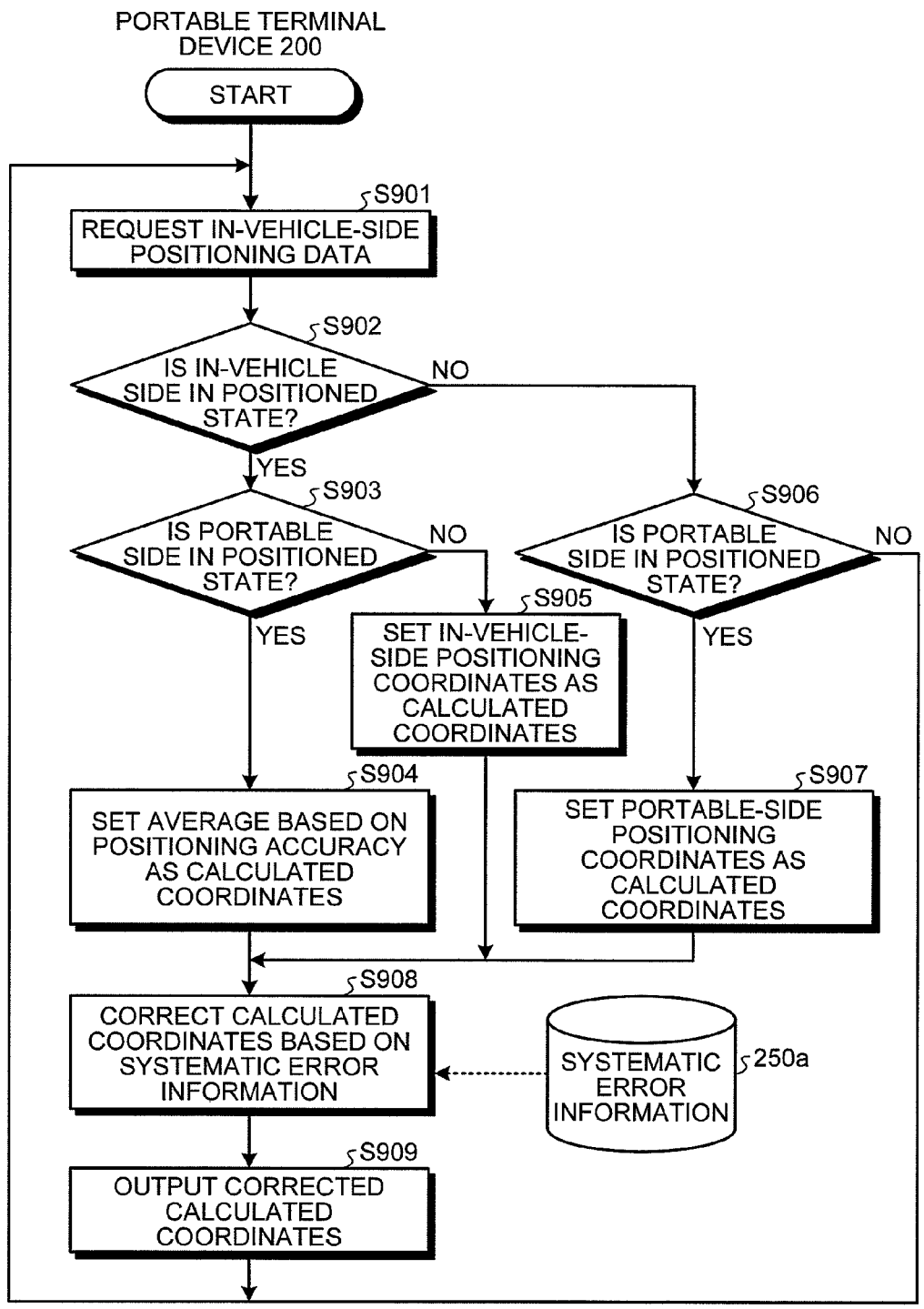
FIG. 14 is a flowchart illustrating an application process procedure of the systematic error information.

Next, explanation is given for a procedure of using the systematic error information 250a by the error correcting unit 240c of the portable terminal device 200 with reference to FIG. 14. FIG. 14 is a flowchart illustrating an application process procedure of the systematic error information 250a. In FIG. 14, because the process performed by the in-vehicle device 100 is similar to FIG. 11, only the process procedure performed by the portable terminal device 200 is illustrated.

As illustrated in FIG. 14, when the portable terminal device 200 requests the in-vehicle-side positioning data (Step S901) and receives the in-vehicle-side positioning data from the in-vehicle device 100, it is determined whether the in-vehicle side is in the positioned state based on the in-vehicle-side positioning accuracy included in the in-vehicle-side positioning data (Step S902). Then, when the in-vehicle side is in the positioned state (Yes at Step S902), it is determined whether the portable side is in the positioned state based on the portable-side positioning accuracy included in the portable-side positioning data (Step S903). The determination processes of determining whether in the positioned state or not at Step S902 and Step S903 are performed based on the in-vehicle-side positioning accuracy and the portable-side positioning accuracy, respectively, in the similar manner to the case of FIG. 11.

Then, when the portable side is in the positioned state (Yes at Step S903), the average of the in-vehicle-side positioning coordinates included in the in-vehicle-side positioning data and the portable-side positioning coordinates included in the portable-side positioning data is set as the calculated coordinates (Step S904). The averaging process at Step S904 can select any of the simple average and the weighted average in the similar manner to FIG. 11.

When the portable side is not in the positioned state at Step S903 (No at Step S903), the in-vehicle-side positioning coordinates are set as the calculated coordinates (Step S905). When the in-vehicle side is not in the positioned state at Step S902 (No at Step S902), it is determined whether the portable side is in the positioned state (Step S906), and when the portable side is in the positioned state (Yes at Step S906), the portable-side positioning coordinates are set as the calculated coordinates (Step S907). Then, the calculated coordinates calculated at Step S904, Step S905, or Step S907 are corrected based on the systematic error information 250a (Step S908), the calculated coordinates after correction are output (Step S909), and the process from Step S901 is repeated.

When the determination condition at Step S906 is not satisfied (No at Step S906), both of the in-vehicle side and the portable side are not in the positioned state, so that the process from Step S901 is repeated without performing the process at Step S909.

As described above, according to the third embodiment, the in-vehicle device obtains the in-vehicle-side positioning coordinates representing the positioned coordinates and the in-vehicle-side positioning accuracy representing the accuracy in the positioning, and transmits the obtained in-vehicle-side positioning coordinates and in-vehicle-side positioning accuracy to the portable terminal device, and the portable terminal device obtains the portable-side positioning coordinates representing the positioned coordinates and the portable-side positioning accuracy representing the accuracy in the positioning, and calculates the vehicle position from the in-vehicle-side positioning coordinates and the portable-side positioning coordinates based on the in-vehicle-side positioning accuracy and the portable-side positioning accuracy, so that the GPS positioning function for in-vehicle and the GPS positioning function for portable are complemented with each other by calculating the vehicle position from the in-vehicle-side positioning coordinates and the portable-side positioning coordinates in accordance with the level of the positioning accuracy, and thus the positioning accuracy when the vehicle is driving can be improved.

Moreover, the systematic error information for the orientation or the area (area) is accumulated, and each of the positioning coordinates are corrected by using the accumulated systematic error information, so that an error having a given tendency in a specific orientation or a specific area can be efficiently corrected. In the first embodiment, the error correction process is performed on the portable terminal device side; however, the positioning system may be configured such that the portable terminal device transmits the portable-side positioning data to the in-vehicle device and the error correction process is performed on the in-vehicle device side.

In the above described third embodiment, explanation is given for a case where the portable terminal device holds the systematic error information; however, the in-vehicle device may also hold the systematic error information. In the fourth embodiment described below, explanation is given for a case where the in-vehicle device also holds the systematic error information.

Fourth Embodiment

Figure 15:
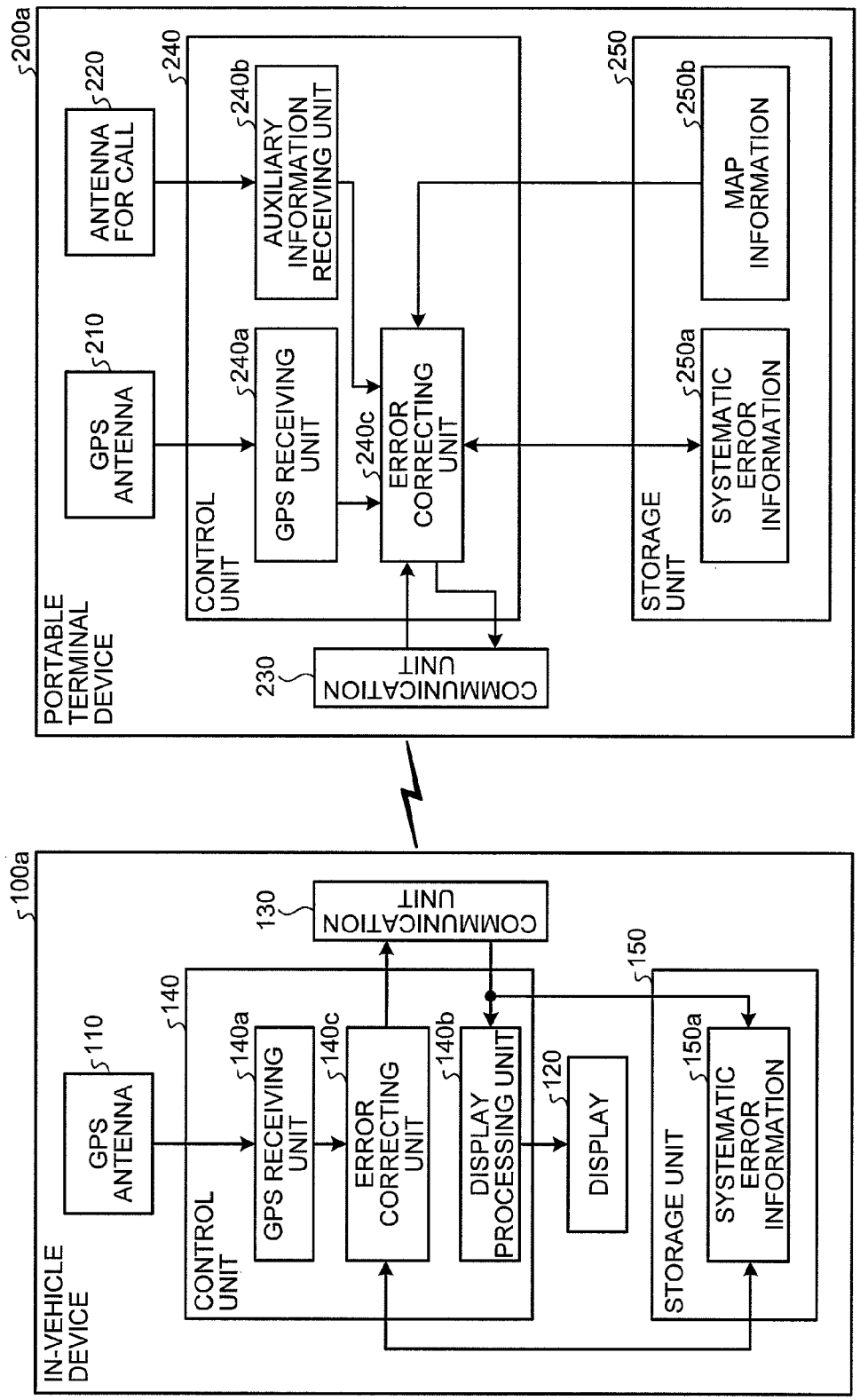
FIG. 15 is a block diagram illustrating configurations of an in-vehicle device and a portable terminal device according to a fourth embodiment.

FIG. 15 is a block diagram illustrating configurations of an in-vehicle device 100a and a portable terminal device 200a according to the fourth embodiment. In the portable terminal device 200a according to the fourth embodiment, although the process performed by the error correcting unit 240c is slightly different from the third embodiment, the basic operation is the same, so that the same reference numerals as in the third embodiment are given. In the in-vehicle device 100a, components different from the in-vehicle device 100 according to the third embodiment are given new reference numerals and the same components are given the same reference numerals as in the third embodiment. In the followings, explanation common to the third embodiment is omitted or briefly explained.

The in-vehicle device 100a further includes a storage unit 150 in which a systematic error information 150a is stored. The storage unit 150 is a storage unit composed of a storage device such as an HDD (Hard Disk Drive) or a RAM (Random Access Memory). The systematic error information 150a is information in which the systematic error of the in-vehicle-side positioning coordinates is accumulated and is provided from the error correcting unit 240c of the portable terminal device 200a. On the other hand, the systematic error information 250a of the portable terminal device 200a is information in which the systematic error of the in-vehicle-side positioning coordinates and the portable-side positioning coordinates is accumulated in the similar manner to the third embodiment.

Then, an error correcting unit 140c provided in the control unit 140 corrects the in-vehicle-side positioning coordinates received from the GPS receiving unit 140a based on the systematic error information 150a and transmits the in-vehicle-side positioning coordinates after correction to the portable terminal device 200a via the communication unit 130 together with the in-vehicle-side positioning accuracy. In this manner, the systematic error information 150a is held on the in-vehicle device 100a side, so that the in-vehicle device 100a can provide the in-vehicle-side positioning coordinates of which systematic error is corrected to the portable terminal device 200*a*.

In the fourth embodiment, in the similar manner to the third embodiment, the systematic error information 250*a* of the portable terminal device 200*a* is information in which the systematic error of the in-vehicle-side positioning coordinates and the portable-side positioning coordinates is accumulated, however, may be information in which only the systematic error of the portable-side positioning coordinates is accumulated. With this configuration, the systematic error of the in-vehicle device 100*a* and the systematic error of the portable terminal device 200*a* can be managed on the in-vehicle device 100*a* side and on the portable terminal device 200*a* side, respectively, so that it is possible to easily cope with the change in combination of the in-vehicle device 100*a* and the portable terminal device 200*a*.

Next, explanation is given for an outline of a process procedure performed by a positioning system according to the fourth embodiment with reference to FIG. 16. FIG. 16 is a flowchart illustrating the outline of the process procedure performed by the positioning system according to the fourth embodiment.

As illustrated in FIG. 16, when the portable terminal device 200*a* requests the in-vehicle-side positioning data (Step S1001), the in-vehicle device 100*a* transmits the in-vehicle-side positioning data to the portable terminal device 200*a* (Step S1002). Next, the portable terminal device 200*a* determines whether the portable side is in the positioned state based on the portable-side positioning accuracy included in the portable-side positioning data (Step S1003).

Then, when the portable side is in the positioned state (Yes at Step S1003), the average of the in-vehicle-side positioning coordinates included in the in-vehicle-side positioning data and the portable-side positioning coordinates included in the portable-side positioning data is set as the calculated coordinates (Step S1004). The averaging process at Step S1004 can select any of the simple average and the weighted average in the similar manner to FIG. 11.

On the other hand, when the portable side is not in the positioned state at Step S1003 (No at Step S1003), the in-vehicle-side positioning coordinates are set as the calculated coordinates (Step S1005). Then, the calculated coordinates are output to the map matching process (Step S1006), and the true coordinates are estimated by the map matching (Step S1007). Next, the difference from the true coordinates is calculated for both positioning coordinates (Step S1008) to accumulate in the systematic error information 250*a*. Then, the difference between the in-vehicle-side positioning coordinates and the true coordinates is transmitted to the in-vehicle device 100*a* (Step S1009), and the process from Step S1001 is repeated.

Moreover, the in-vehicle device 100*a* that receives the difference between the in-vehicle-side positioning coordinates and the true coordinates performs a process of accumulating the error information in the systematic error information 150*a* (Step S1010), corrects the in-vehicle-side positioning data based on the systematic error information 150*a* (Step S1011), and repeated the process from Step S1002.

In this manner, according to the fourth embodiment, the systematic error information is held also in the in-vehicle device side, so that the in-vehicle device can provide the in-vehicle-side positioning coordinates of which systematic error is corrected to the portable terminal device.

INDUSTRIAL APPLICABILITY

As described above, the positioning system and the in-vehicle device according to the present invention are useful for improving the positioning accuracy, and are particularly suitable for a case where the positioning accuracy when a vehicle is driving needs to be improved.

The invention claimed is:

1. A positioning system that positions a vehicle position, the positioning system comprising:
   an in-vehicle device mounted on a vehicle; and
   a portable terminal device,
   wherein the in-vehicle device includes:
      an in-vehicle-side positioning unit that obtains in-vehicle-side positioning data that includes in-vehicle-side positioning coordinates representing in-vehicle positioned coordinates of the vehicle; and
      a transmitting unit that transmits the in-vehicle-side positioning data obtained by the in-vehicle-side positioning unit to the portable terminal device, and
   wherein the portable terminal device includes:
      a portable-side positioning unit that obtains portable-side positioning data that includes portable-side positioning coordinates representing portable-side positioned coordinates of the vehicle;
      a selecting unit that selects
         (i) the in-vehicle-side positioning data when a positioning accuracy of the in-vehicle-side positioning data is greater than or equal to a predetermined value and a positioning accurate of the portable-side positioning data is not greater than or equal to the predetermined value,
         (ii) the portable-side positioning data when the positioning accuracy of the in-vehicle-side positioning data is not greater than or equal to the predetermined value and the positioning accuracy of the portable-side positioning data is greater than or equal to the predetermined value, and
         (iii) an average of the in-vehicle-side positioning data and the portable-side positioning data when the positioning accuracy of the in-vehicle-side positioning data is greater than or equal to the predetermined value and the positioning accuracy of the portable-side positioning data is greater than or equal to the predetermined value; and
      a vehicle-position calculating unit that sets the in-vehicle-side positioning coordinates, the portable-side positioning coordinates or an average of the in-vehicle-side positioning coordinates and the portable-side positioning coordinates as the vehicle position based on a selection of the selecting unit.

2. The positioning system according to claim 1, wherein the selecting unit selects at least one of the in-vehicle-side positioning data and the portable-side positioning data based on a driving speed of the vehicle.

3. The positioning system according to claim 1, wherein the selecting unit selects at least one of the in-vehicle-side positioning data and the portable-side positioning data based on an elapsed time in which the portable terminal device is present in the vehicle.

4. The positioning system according to claim 1, wherein the positioning accuracy of each of the in-vehicle-side positioning data and the portable-side positioning data represents an accuracy in positioning.

5. The positioning system according to claim 4, wherein the vehicle-position calculating unit calculates the vehicle position by calculating a weighted average of the in-vehicle-side positioning coordinates and the portable-side positioning coordinates based on the positioning accuracy when the average of the in-vehicle-side positioning data and the portable-side positioning data is selected by the selecting unit.

6. The positioning system according to claim 1, wherein
each of the in-vehicle-side positioning data and the portable-side positioning data includes satellite information indicating positioning,
the in-vehicle-side positioning unit of the in-vehicle device performs positioning by using the satellite information obtained from the portable terminal device when the satellite information included in the in-vehicle-side positioning data is invalid, and
the portable-side positioning unit of the portable terminal device performs positioning by using the satellite information obtained from the in-vehicle device when the satellite information included in the portable-side positioning data is invalid.

7. The positioning system according to claim 1, wherein when the positioning accuracy of the in-vehicle-side positioning data is not greater than or equal to the predetermined value and the positioning accuracy of the portable-side positioning data is not greater than or equal to the predetermined value, the selecting unit selects neither of the in-vehicle-side positioning data and the portable-side positioning data, and the in-vehicle-side positioning unit updates the in-vehicle-side positioning data and the portable-side positioning unit updates the portable-side positioning data.

8. An in-vehicle device that positions a vehicle position in cooperation with a portable terminal device, the in-vehicle device comprising:
an in-vehicle-side positioning unit that obtains in-vehicle-side positioning data that includes in-vehicle-side positioning coordinates representing in-vehicle positioned coordinates of a vehicle;
a receiving unit that receives portable-side positioning data that includes portable-side positioning coordinates representing portable-side positioned coordinates of the vehicle positioned by the portable terminal device;
a selecting unit that selects
(i) the in-vehicle-side positioning data when a positioning accuracy of the in-vehicle-side positioning data is greater than or equal to a predetermined value and a positioning accuracy of the portable-side positioning data is not greater than or equal to the predetermined value,
(ii) the portable-side positioning data when the positioning accuracy of the in-vehicle-side positioning data is not greater than or equal to the predetermined value and the positioning accuracy of the portable-side positioning data is greater than or equal to the predetermined value, and
(iii) an average of the in-vehicle-side positioning data and the portable-side positioning data when the positioning accuracy of the in-vehicle-side positioning data is greater than or equal to the predetermined value and the positioning accuracy of the portable-side positioning data is greater than or equal to the predetermined value; and
a vehicle-position calculating unit that sets the in-vehicle-side positioning coordinates, the portable-side positioning coordinates or an average of the in-vehicle-side positioning coordinates and the portable-side positioning coordinates as the vehicle position based on a selection of the selecting unit.

9. A positioning system that positions a vehicle position, the positioning system comprising:
an in-vehicle device mounted on a vehicle; and
a portable terminal device,
wherein the in-vehicle device includes:
an in-vehicle-side positioning unit that obtains in-vehicle-side positioning coordinates representing in-vehicle-side positioned coordinates of the vehicle and an in-vehicle-side positioning accuracy representing an in-vehicle-side accuracy in positioning; and
a transmitting unit that transmits the in-vehicle-side positioning coordinates and the in-vehicle-side positioning accuracy obtained by the in-vehicle-side positioning unit to the portable terminal device, and
wherein the portable terminal device includes:
a portable-side positioning unit that obtains portable-side positioning coordinates representing portable-side positioned coordinates of the vehicle and a portable-side positioning accuracy representing a portable-side accuracy in positioning; and
a vehicle-position calculating unit that sets, as the vehicle position, (i) the in-vehicle-side positioning coordinates when the in-vehicle-side positioning accuracy is greater than or equal to a predetermined value and the portable-side positioning accuracy is not greater than or equal to the predetermined value, (ii) the portable-side positioning coordinates when the in-vehicle-side positioning accuracy is not greater than or equal to the predetermined value and the portable-side positioning accuracy is greater than or equal to the predetermined value, and (iii) an average of the in-vehicle-side positioning coordinates and the portable-side positioning coordinates when the in-vehicle-side positioning accuracy is greater than or equal to the redetermined value and the portable-side positioning accuracy is greater than or equal to the predetermined value.

10. The positioning system according to claim 9, wherein the vehicle-position calculating unit of the portable terminal device calculates the vehicle position by calculating a weighted average of the in-vehicle-side positioning coordinates and the portable-side positioning coordinates when the average of the in-vehicle-side positioning coordinates and the portable-side positioning coordinates is set as the vehicle position.

11. The positioning system according to claim 9, wherein the portable terminal device further includes a correcting unit that corrects the vehicle position set by the vehicle-position calculating unit based on map information representing road layout information.

12. The positioning system according to claim 11, wherein the portable terminal device further includes a systematic error accumulating unit that calculates a systematic error representing an error tendency for each orientation or each area by associating an error between the vehicle position corrected by the correcting unit and the in-vehicle-side positioning coordinates and an error between the vehicle position corrected by the correcting unit and the portable-side positioning coordinates with a travelling direction of the vehicle or an area in which the vehicle drives to accumulate in a storage unit, and
the vehicle-position calculating unit sets the vehicle position after correcting the in-vehicle-side positioning coordinates and the portable-side positioning coordinates based on the systematic error.

13. The positioning system according to claim 12, wherein the systematic error accumulating unit of the portable terminal device calculates the error tendency for each orientation of the systematic error based on the in-vehicle-side positioning accuracy and the portable-side positioning accuracy.

14. The positioning system according to claim 12, wherein
the portable terminal device further includes a systematic error transmitting unit that transmits the systematic error of the in-vehicle-side positioning coordinates to the in-vehicle device, the in-vehicle device further includes an in-vehicle-side systematic-error accumulating unit that accumulates the systematic error received from the portable terminal device in a storage unit, and the transmitting unit of the in-vehicle device transmits the in-vehicle-side positioning coordinates corrected based on the systematic error accumulated in the in-vehicle-side systematic-error accumulating unit to the portable terminal device.

* * * * *